US012522635B2

(12) United States Patent
Moffet et al.

(10) Patent No.: US 12,522,635 B2
(45) Date of Patent: Jan. 13, 2026

(54) AMYLOID PEPTIDE VARIANTS

(71) Applicants: Loyola Marymount University, Los Angeles, CA (US); Mount Saint Mary's University, Los Angeles, CA (US)

(72) Inventors: David Moffet, Canoga Park, CA (US); Luiza Nogaj, Canoga Park, CA (US)

(73) Assignees: Loyola Marymount University, Los Angeles, CA (US); MOUNT SAINT MARY'S UNIVERSITY, Los Angeles, CA (US)

( * ) Notice: Subject to any disclaimer, the term of this patent is extended or adjusted under 35 U.S.C. 154(b) by 13 days.

(21) Appl. No.: 17/428,615

(22) PCT Filed: Feb. 24, 2020

(86) PCT No.: PCT/US2020/019557
§ 371 (c)(1),
(2) Date: Aug. 4, 2021

(87) PCT Pub. No.: WO2020/172686
PCT Pub. Date: Aug. 27, 2020

(65) Prior Publication Data

US 2022/0119468 A1 Apr. 21, 2022

Related U.S. Application Data

(60) Provisional application No. 62/809,167, filed on Feb. 22, 2019.

(51) Int. Cl.
*C07K 14/47* (2006.01)
*A61P 5/50* (2006.01)
*A61K 38/00* (2006.01)

(52) U.S. Cl.
CPC ............ *C07K 14/4711* (2013.01); *A61P 5/50* (2018.01); *A61K 38/00* (2013.01)

(58) Field of Classification Search
CPC ........ C07K 14/4711; A61P 5/50; A61K 38/00
See application file for complete search history.

(56) References Cited

U.S. PATENT DOCUMENTS

| | | | |
|---|---|---|---|
| 5,686,411 | A | 11/1997 | Gaeta et al. |
| 5,814,600 | A | 9/1998 | Rink et al. |
| 7,060,670 | B1 | 6/2006 | Chalifour et al. |
| 9,593,154 | B2 | 3/2017 | Erickson et al. |
| 2008/0213262 | A1 | 9/2008 | Jaikaran et al. |

FOREIGN PATENT DOCUMENTS

| | | | |
|---|---|---|---|
| CN | 1646559 | A | 7/2005 |
| CN | 101855240 | A | 10/2010 |
| CN | 110402308 | A | 11/2019 |
| CN | 112225808 | A | 1/2021 |
| CN | 112672755 | A | 4/2021 |
| WO | 2004083243 | A1 | 9/2004 |
| WO | 2007114838 | A1 | 10/2007 |
| WO | 2012168432 | A | 12/2012 |
| WO | 2012170993 | A2 | 12/2012 |
| WO | 2015062803 | A1 | 5/2015 |
| WO | 2018/144671 | | 8/2018 |

OTHER PUBLICATIONS

Li Fan, Altered Gene Structure and Tissue Expression of Islet Amyloid Polypeptide in the Chicken, Molecular Endocrinology 8: 713-721, 1994).*

Jessica Fortin, Characterization of the role of amylin (IAPP) in diabetes type 2: studies of peptide derivatives and compounds inhibitors of amyloid formation), University of Montreal, Dissertation, published online 2015.*

Neddenriep, Bradley et al., Short Peptides as Inhibitors of Amyloid Aggregation, Open Biotechnol J., 2011, pp. 39-46.

Oakes, Alissa, et al., Nonhuman IAPP Variants Inhibit Human IAPP Aggregation, Protein & Peptide Letters, 2021, 28: 963-971.

Palato, LM, et al., Amyloidogenicity of naturally occurring full-length animal IAPP variants, J Pep Sci., 2019, e3199.

Search Report and Written Opinion for corresponding International Patent Application No. PCT/US2020/019557, dated Jun. 22, 2020.

Supplementary European Search Report for corresponding European Patent Application No. 20759401.1, dated May 17, 2023, 26 pages.

Database UniProt [Online] Nov. 1, 1996 (Nov. 1, 1996), XP002809194, retrieved from EBI accession No. UniProt: Q90743 Database accession No. Q90743, 1996, 3 pgs.

Database UniProt [Online] Jun. 26, 2013 (Jun. 26, 2013), XP002809195, retrieved from EBI accession No. UniProt:ROJN79 Database accession No. ROJN79, 2013, 2 pgs.

Database UniProt [Online] Jul. 18, 2018 (Jul. 18, 2018), XP002809196, retrieved from EBI accession No. UniProt: AOA2U3XBL9 Database accession No. AOA2U3XBL9, 2018, 1 pg.

Database UniProt [Online] Oct. 19, 2011 (Oct. 19, 2011), XP002809197, retrieved from EBI accession No. UniProt:G1NLJ8 Database accession No. G1NLJ8, 2011, 2 pgs.

Fan, Li et al., "Altered gene structure and tissue expression of islet amyloid polypeptide in the chicken", Molecular endocrinology (Baltimore, Md.), Jun. 1, 1994 (Jun. 1, 1994), pp. 713-721.

Partial European Search Report for corresponding European Patent Application No. 20759401.1, dated Jan. 26, 2023, 12 pages.

Ayano Fox et al: "Selection for Nonamyloidogenic Mutants of Islet Amyloid Polypeptide (IAPP) Identifies an Extended Region for Amyloidogenicity", Biochemistry, vol. 49, No. 36, Sep. 14, 2010, pp. 7783-7789.

Nese Kurt, et al., "Supporting Information, The Burial of Solvent-Accessible Surface Area Is a Predictor of Polypeptide Folding and Misfolding as a Function of Chain Elongation", Oct. 20, 2005, XP93010381, Retrieved from the Internet: URL:https://pubs.acs.org/doi/suppl/10.1021/ja0560682/suppl_file/ja0560682si20051010_020137. pdf [retrieved on Dec. 21, 2022].

(Continued)

*Primary Examiner* — Julie Ha
*Assistant Examiner* — Erinne R Dabkowski
(74) *Attorney, Agent, or Firm* — Michael Fedrick; LOZA & LOZA, LLP

(57) ABSTRACT

IAPP peptides which inhibit the aggregation of human Islet Amyloid Polypeptide and their use in inhibiting amyloid fibril formation.

3 Claims, 22 Drawing Sheets

Specification includes a Sequence Listing.

(56) References Cited

OTHER PUBLICATIONS

Kurt Nese et al: "The Burial of Solvent-Accessible Surface Area is a Predictor of Polypeptide Folding and Misfolding as a Function of Chain Elongation", Journal of the American Chemical Society, vol. 127, No. 45, Oct. 20, 2005, pp. 15690-15691.
Database UniProt [Online] Mar. 28, 2018 (Mar. 28, 2018), XP002808307, retrieved from EBI accession No. UniProt: A0A2J8QRF7 Database accession No. A0A2J8QRF7, https://rest.uniprot.org/unisave/ A0A2J8QRF7?format=txt&versions=3, Dec. 12, 2022, 1 page.
IAPP isoform 5, partial [Pan troglodytes], Database GenBank [online], Accession No. PNI98857.1, Sep. 12, 2018, URL : https://www.ncbi.nlm.nih.gov/protein/PNI98857.1.
IAPP isoform 3, partial [Pongo abelii], Database GenBank [online], Accession No. PNJ86803.1, Sep. 12, 2018, URL: https://www.ncbi.nlm.nih.gov/protein/PNJ86803.1.
Office Action in corresponding Japanese Patent Application No. 2021-549163, issued Sep. 19, 2023.
Pollen, A. et al., Genbank database, Jan. 19, 2018, IAPP isoform 5, partial [Pan troglodytes], Accession No. PNI98857.

* cited by examiner

Figure 1

| | | | |
|---|---|---|---|
| Human | KCNTATCATQRLANFLVHSSNNFGAILSSTNVGSNTY | (SEQ ID NO:1) | inhibit hIAPP aggregation |
| Cat | KCNTATCATQRLANFL**IR**SSNN**L**GAILS**P**TNVGSNTY | (SEQ ID NO:2) | |
| Dog | KCNTATCATQRLANFLV**RT**SNN**L**GAILS**P**TNVGSNTY | (SEQ ID NO:3) | |
| Chicken | KCNTATC**V**TQRLA**D**FLV**R**SS**S**N**I**GAI**Y**S**P**TNVGSNTY | (SEQ ID NO:4) | |
| Polar bear | KCNTATCATQRLANFLV**R**S**G**N**L**FGAILS**P**TNVGSNTY | (SEQ ID NO:5) | |
| Raccoon | KCNTATC**V**TQRLANFL**LR**SSNN**L**GAILS**P**TNVGSNTY | (SEQ ID NO:6) | |
| Seal | KCNTATCATQRLANFLV**R**SSNN**L**GAILS**P**TNVGSNTY | (SEQ ID NO:7) | |
| Cow | KC**G**TATC**E**TQRLANFL**AP**SSN**KL**GAI**F**S**P**T**KM**GSNTY | (SEQ ID NO:8) | do not inhibit hIAPP aggregation |
| Degu | KCNTATCATQRL**T**NFLV**R**SS**H**N**L**GA**A**L**PP**T**K**VGSNTY | (SEQ ID NO:9) | |
| Guinea pig | KCNTATCATQRL**T**NFLV**R**SS**H**N**L**GA**A**L**LP**T**D**VGSNTY | (SEQ ID NO:10) | |
| Horse | KC**D**TATC**V**TQRLANFLVHSSNN**L**GAILS**P**T**S**VGSNTY | (SEQ ID NO:11) | |
| Pig | KCN**M**ATCATQ**H**LANFL**DR**S**R**NNFGAI**F**S**P**T**K**VGSNTY | (SEQ ID NO:12) | |
| Rat | KCNTATCATQRLANFLV**R**SSNN**L**G**PV**L**PP**TNVGSNTY | (SEQ ID NO:13) | |
| Sheep | KC**G**TATCATQRLANFL**AP**S**G**N**KL**GA**VF**S**PRKM**GSNT**H** | (SEQ ID NO:14) | |

Figure 7

| Name | Sequence | Sequence No. | Inhibit | Rescue |
|---|---|---|---|---|
| Human | KCNTATCATQRLANFLVHSSNNFGAILSSTNVGSNTY | (SEQ ID NO:1) | | |
| WS | KCNTATCATQRLANFLV**R**SSNN**L**GAILS**P**TNVGSNTY | (SEQ ID NO:7) | **yes** | **yes** |
| WS_R | KCNTATCATQRLANFLV**R**SSNNFGAILSSTNVGSNTY | (SEQ ID NO:15) | no | **yes** |
| WS_L | KCNTATCATQRLANFLVHSSNN**L**GAILSSTNVGSNTY | (SEQ ID NO:19) | no | no |
| WS_P | KCNTATCATQRLANFLVHSSNNFGAILS**P**TNVGSNTY | (SEQ ID NO:20) | no | no |
| WS_RL | KCNTATCATQRLANFLV**R**SSNN**L**GAILSSTNVGSNTY | (SEQ ID NO:16) | **yes** | **yes** |
| WS_RP | KCNTATCATQRLANFLV**R**SSNNFGAILS**P**TNVGSNTY | (SEQ ID NO:17) | no | **yes** |
| WS_LP | KCNTATCATQRLANFLVHSSNN**L**GAILS**P**TNVGSNTY | (SEQ ID NO:18) | **yes** | no |

Figure 11

| Name | Sequence | Sequence No. | Inhibit | Rescue |
|---|---|---|---|---|
| Raccoon | KCNTATCVTQRLANFLLRSSNNLGAILS-PTNVGSNTY | (SEQ ID NO:6) | **yes** | **yes** |
| R-N(15-37) | FLLRSSNNLGAILSPTNVGSNTY | (SEQ ID NO:21) | no | no |
| R-Mid(15-31) | FLLRSSNNLGAILSPTN | (SEQ ID NO:22) | no | no |
| R-N12(8-37) | ATQRLANFLLRSSNNLGAILSPTNVGSNTY | (SEQ ID NO:23) | no | no |
| R8-30: | VTQRLANFLLRSSNNLGAILSPT | (SEQ ID NO:24) | no | no |
| R8-23 | VTQRLANFLLRSSNNL | (SEQ ID NO:25) | no | no |
| R-C(1-30) | KCNTATCVTQRLANFLLRSSNNLGAILSPT | (SEQ ID NO:31) | **yes** | **yes** |
| R1-29 | KCNTATCVTQRLANFLLRSSNNLGAILSP | (SEQ ID NO:32) | **yes** | **yes** |
| R1-27 | KCNTATCVTQRLANFLLRSSNNLGAIL | (SEQ ID NO:34) | **yes** | **yes** |
| R1-23 | KCNTATCVTQRLANFLLRSSNNL | (SEQ ID NO:38) | no | no |
| R1-20 | KCNTATCVTQRLANFLLRSS | (SEQ ID NO:39) | no | no |
| R1-16 | KCNTATCVTQRLANFL | (SEQ ID NO:40) | no | no |
| R1-14 | KCNTATCVTQRLAN | (SEQ ID NO:41) | no | no |

Figure 14

| Name | Sequence | Sequence No. | Inhibit | Rescue |
|---|---|---|---|---|
| Rac_V8A | KCNTATC**A**TQRLANFLLRSSNNLGAIL-SPTNVGSNTY | (SEQ ID NO:42) | **yes** | no |
| Rac_N13D | KCNTATCVTQRLA**D**FLLRSSNNLGAIL-SPTNVGSNTY | (SEQ ID NO:43) | **yes** | no |
| Rac_L16V | KCNTATCVTQRLANFL**V**RSSNNLGAIL-SPTNVGSNTY | (SEQ ID NO:44) | **yes** | no |
| Rac_L22I | KCNTATCVTQRLANFLLRSSNN**I**GAIL-SPTNVGSNTY | (SEQ ID NO:45) | **yes** | no |
| Rac_L26Y | KCNTATCVTQRLANFLLRSSNNLGAI**Y**-SPTNVGSNTY | (SEQ ID NO:46) | **yes** | **yes** |

Thioflavin T Binding of Chicken and Raccoon Variants Mixed with Human IAPP (Bar chart: Fluorescence Emission (488 nm) vs. variants: hIAPP, Ch_V8A, Ch_D13N, Ch_V18I, Ch_V26I, Ch_I22L, Ch_Y25I, Rac_V8A, Rac_N13D, Rac_I18V, Rac_I22L, Rac_L25Y; time points: 10 minutes, 20 minutes, 25 minutes, 30 minutes)

Figure 17

| Name | Sequence | Sequence No. | Inhibit | Rescue |
|---|---|---|---|---|
| Chicken | KCNTATCVTQRLADFLVRSSSNIGAIY-SPTNVGSNTY | (SEQ ID NO:6) | **yes** | **yes** |
| C8-37 | ATQRLADFLVRSSSNIGAIYSPTNVGSNTY | (SEQ ID NO:44) | no | no |
| C1-29 | KCNTATCVTQRLADFLVRSSSNIGAIYSP | (SEQ ID NO:59) | no | **yes** |
| C1-27 | KCNTATCVTQRLADFLVRSSSNIGAIY | (SEQ ID NO:61) | **yes** | **yes** |
| C1-23 | KCNTATCVTQRLADFLVRSSSNI | (SEQ ID NO:45) | no | no |
| C1-20 | KCNTATCVTQRLADFLVRSS | (SEQ ID NO:46) | no | no |
| C1-18 | KCNTATCVTQRLADFLVR | (SEQ ID NO:47) | no | no |
| C1-16 | KCNTATCVTQRLADFL | (SEQ ID NO:48) | no | no |
| C1-14 | KCNTATCVTQRLAD | (SEQ ID NO:49) | no | no |

Figure 20

| Name | Sequence | Sequence No. | Inhibit | Rescue |
|---|---|---|---|---|
| Ch_V8A | KCNTATC**A**TQRLADFLVRSSSNIGAIYSPTNVGSNTY | (SEQ ID NO:65) | no | **yes** |
| Ch_D13N | KCNTATCVTQRLA**N**FLVRSSSNIGAIYSPTNVGSNTY | (SEQ ID NO:69) | no | no |
| Ch_V16L | KCNTATCVTQRLADFL**L**RSSSNIGAIYSPTNVGSNTY | (SEQ ID NO:66) | **yes** | **yes** |
| Ch_I22L | KCNTATCVTQRLADFLVRSSSN**L**GAIYSPTNVGSNTY | (SEQ ID NO:67) | **yes** | **yes** |
| Ch_Y26L | KCNTATCVTQRLADFLVRSSSNIGAI**L**SPTNVGSNTY | (SEQ ID NO:68) | **yes** | **yes** |

AMYLOID PEPTIDE VARIANTS

CROSS-REFERENCE TO RELATED APPLICATIONS

This application is the U.S. national stage of International Patent Application No. PCT/US2020/019557, filed on Feb. 24, 2020 and entitled AMYLOID PEPTIDE VARIANTS, which claims the benefit of priority under 35 U.S.C. § 119(e) from U.S. Patent Application No. 62/809,167 filed on Feb. 22, 2019. The disclosures of the foregoing applications are incorporated herein by reference in their entirety.

SEQUENCE LISTING

The entire content of a Sequence Listing titled "Sequence-_Listing.txt" created on Aug. 4, 2021 and having a size of 26 kilobytes, which has been submitted in electronic form in connection with the present application, is hereby incorporated by reference herein in its entirety.

BACKGROUND

Many proteins are known to adopt alternative, misfolded structures that can be linked to a variety of diseases. Proteins such as human Islet Amyloid Polypeptide (hIAPP, amylin) in type 2 diabetes, Aβ42 in Alzheimer's disease, and α-synuclein in Parkinson's disease are all known to misfold and aggregate into toxic oligomers and fibers. While it is known that these misfolded proteins are toxic to cells, the exact role they play in the progression of these diseases remains a mystery.

The amyloid diseases represent a serious threat to human health. The economic and social costs associated with type 2 diabetes have been well documented over the past decade. The American Diabetes Association estimates that 25.8 million children and adults in the United States have diabetes, approximately 8.3% of the population with nearly 2 million new cases diagnosed each year. Because the prevalence of this disease increases with age, the number of people afflicted with type 2 diabetes will increase as our population ages. If no treatments are found to prevent or slow the progression of this disease, it is estimated that as many as 100 million Americans alone could have diabetes in the next 40 years, at a cost estimated to be more than $174 billion annually. In 2008, $116 billion was spent in the US for direct medical costs, with an additional indirect cost estimated at $58 billion for work loss, disability and premature mortality.

While obesity is a clear factor linked to type 2 diabetes, over 70% of obese people do not have diabetes, suggesting that other factors influence the progression of this disease. One possible factor linked to the progression of type 2 diabetes is the aggregation of the amyloidogenic peptide Islet Amyloid Polypeptide (IAPP). This 37 amino acid polypeptide is co-secreted from pancreatic β-islet cells with insulin. During the progression of type 2 diabetes, IAPP aggregates into a variety of different amyloidogenic states. It is known that IAPP is found as extracellular deposits of amyloid in over 90% of patients afflicted with this disease.

The link between IAPP aggregation and diabetes seems to extend to non-humans as well. Like humans, cats and primates are known to develop diabetes. Also like humans, cats and primates express IAPP variants that aggregate and form toxic amyloid. Conversely, IAPP variants from rat, mouse and hamster do not aggregate, nor do they form toxic amyloidogenic species. Rats, mice and hamsters do not spontaneously develop diabetes. However, when mice and rats are engineered to express human IAPP, they do develop type 2 diabetes and the symptoms associated with the disease.

Recently it has been suggested that one form of IAPP may adopt a cylindrin fold. While the structure of aggregate-forming IAPP molecules remains to be determined, it is clear that some of these aggregates are highly toxic to cells. Studies have shown that synthetic IAPP acts as a highly toxic agent in vitro when added to human islet 3-cells as well as to a variety of additional mammalian cell lines. IAPP is found as extracellular deposits of amyloid in approximately 90% of patients afflicted with type 2 diabetes. IAPP has also been shown to be a toxic agent in vitro when added to mammalian cells. While it remains unclear how self-assembly of IAPP leads to the development of disease, recent studies have suggested that the formation of lower order protein aggregates (two to ten self-assembled proteins) leads to cellular toxicity and ultimately to the progression of disease.

SUMMARY

We have recently identified a series of IAPP peptides that inhibit human IAPP aggregation and rescue mammalian cells from hIAPP toxicity. These IAPP variants are potent inhibitors of hIAPP aggregation and can be used as therapeutic agents and probes to understand the root toxicity of amyloid protein. The present IAPP peptides have an amino acid sequence selected from one of the following sequences:

a) SEQ ID NOS:15-18,
b) SEQ ID NOS:26-37,
c) SEQ ID NOS:42-46,
d) SEQ ID NOS:53-64, and
e) SEQ ID NOS:65-68.

These peptides include peptides mutated from Weddell seal IAPP (SEQ ID NOS:15-18), racoon IAPP (SEQ ID NOS:26-37 and SEQ ID NOS:42-46), and chicken IAPP (SEQ ID NOS:53-64 and SEQ ID NOS:65-68). In some embodiments, preferred sequences include SEQ ID NOS: 16-17 (WS_RL and WS_RP); SEQ ID NO:46 (Rac_L26Y); SEQ ID NOS:31-34 (R1-27 to R1-30); SEQ ID NOS:66-68 (Chv16L, ChI22L, ChY26L); and SEQ ID NOS: 59-61 (C1-27 to C1-29).

The foregoing IAPP peptides can be used to inhibit hIAPP aggregation in vitro or in vivo. In one embodiment, these peptides can be used in the treatment of an amyloid disease such as diabetes. When used in therapeutic applications, the IAPP peptides can be combined with one or more pharmaceutically acceptable excipients to form a pharmaceutical composition.

IAPP peptides found naturally in cats, dogs, chickens, polar bears, raccoons, and Weddell seals can also be used in the treatment of an amyloid disease and to inhibit hIAPP aggregation. These peptides can have a sequence selected from SEQ ID NOS:2-7. The IAPP peptides of raccoon and chicken are preferred.

The present IAPP peptides can thus be used in a method of treating a subject suffering from an amyloid disease which includes the step of administering an IAPP peptide to a subject in need thereof, where the IAPP peptide has an amino acid sequence selected from SEQ ID NOS:2-7, SEQ ID NOS:15-18, SEQ ID NOS:26-37, SEQ ID NOS: 42-46, SEQ ID NOS:53-64, and SEQ ID NOS:65-68.

FIGURES

FIG. 1 is a table comparing human IAPP with IAPP of various animals. Amino acids that differ from hIAPP are indicated in bold.

Figure 3:
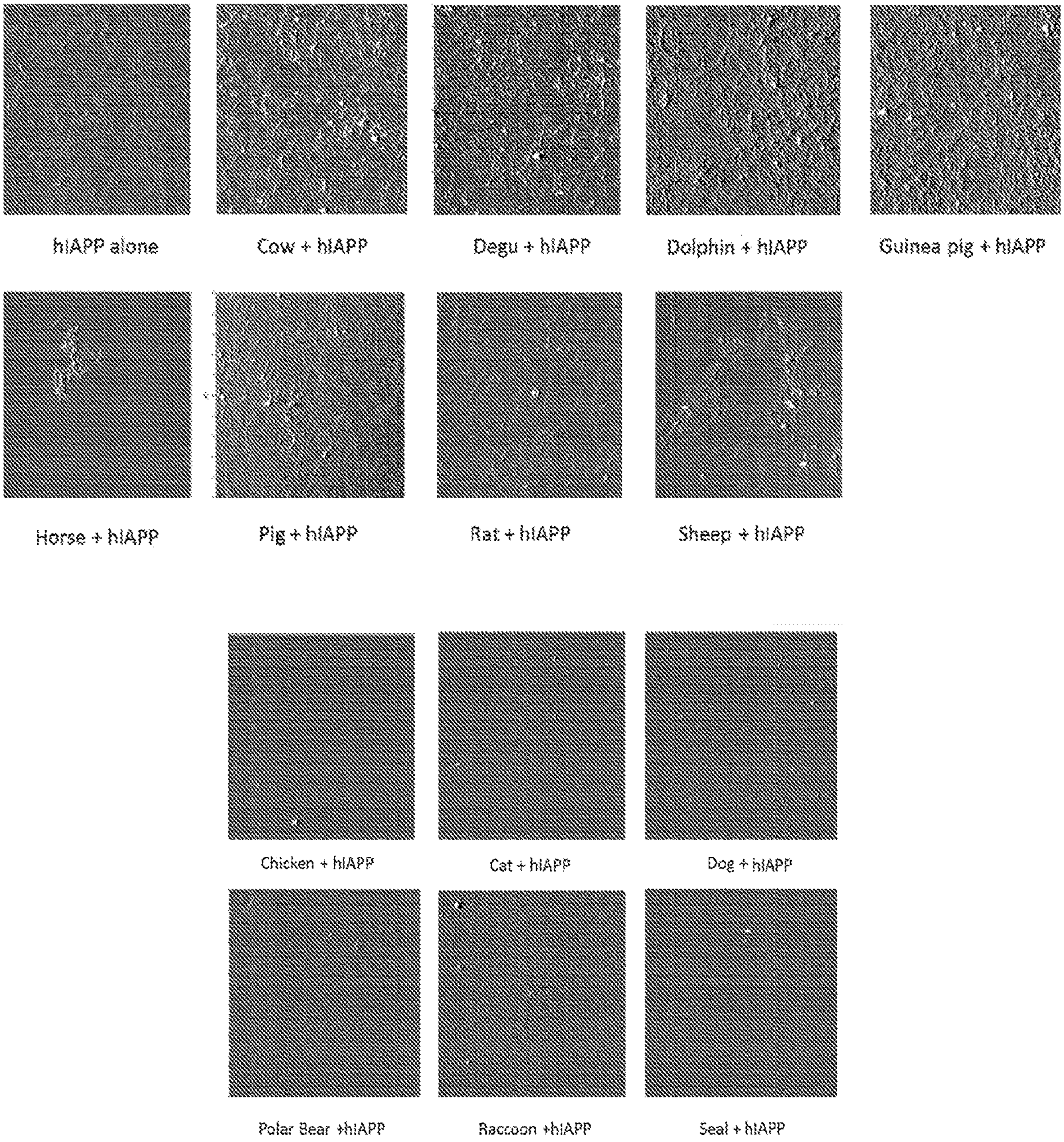

FIG. 3 shows the results of Atomic Force Microscopy (AFM) scanning of IAPP variants. 37 μM Human IAPP was mixed with 75 μM of each animal IAPP, and samples were incubated at 37° C. for 40 minutes with shaking. All scans show raw data with no flattening and are 10 m×10 m.

Figure 4:
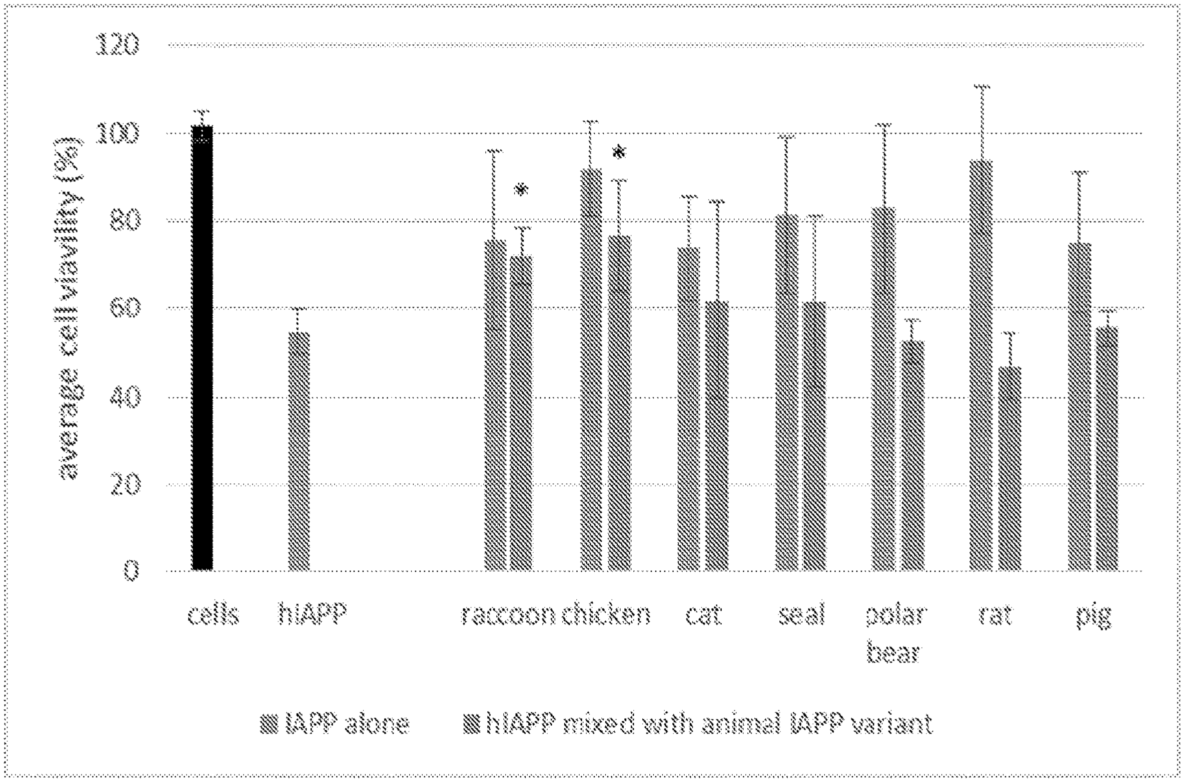

FIG. 4 is a chart showing the results of an MTT viability assay. The black bar at the far left shows the average viability of cells alone. The left-side bar above each species identifier (racoon, chicken, etc.) on the horizontal axis indicates the average cell viability upon addition of 12.8 μM hIAPP or animal IAPP variants individually. The right-side bar above each species identifier on the horizontal axis displays cell viability of hIAPP mixed with each animal IAPP variant (12.8 μM of a mixture of hIAPP with each indicated animal IAPP at a 1:1 ratio). Asterisks show a significant increase in cell viability between hIAPP alone and hIAPP mixed with raccoon or chicken IAPP variants.

Figure 5:
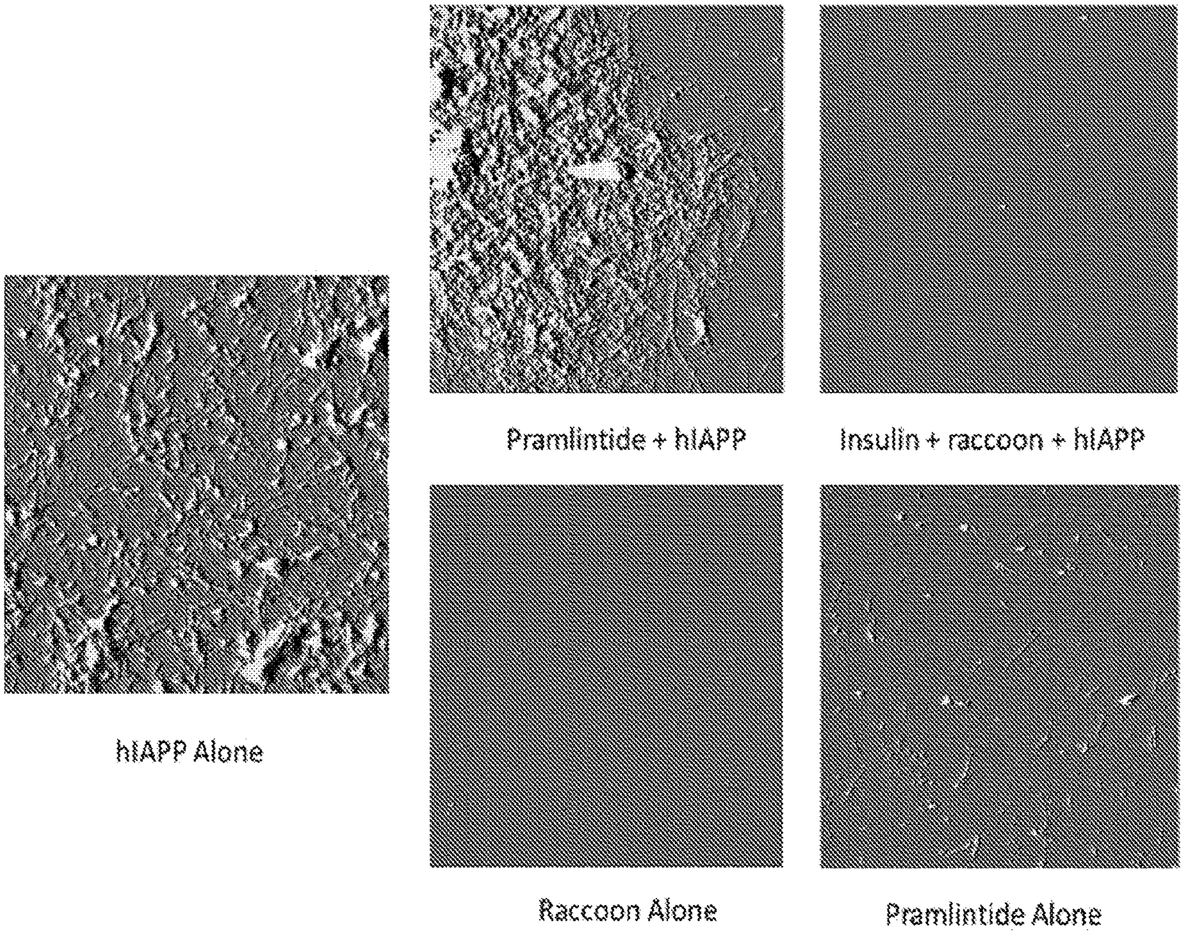

FIG. 5 shows the results of AFM scanning of the indicated materials. Samples labeled with hIAPP contained 40 μM hIAPP. The sample with pramlintide and hIAPP contained a 2:1 molar mixture (80 μM Pramlintide mixed with 40 μM hIAPP). The samples with raccoon IAPP and Pramlintide alone contained 40 μM of the indicated peptides. Each sample was incubated for 40 minutes at 37° C. with shaking; conditions known to promote hIAPP amyloid formation. All scans show raw data with no flattening and are 10 m×10 m.

Figure 6:
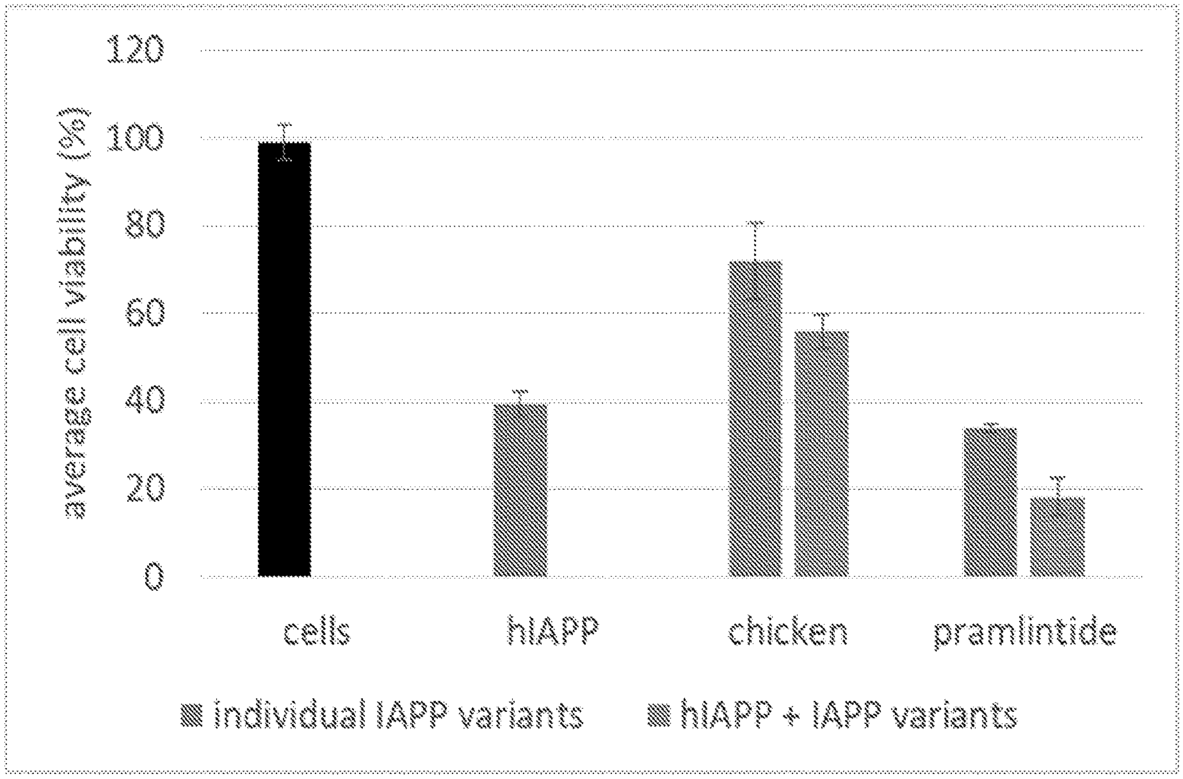

FIG. 6 is a chart showing the results of an MTT viability assay. The bar on the left side shows the average viability of cells alone. The left-side bar above each peptide identifier on the horizontal axis indicates the average cell viability upon addition of 12.8 μM hIAPP or IAPP variants individually (variants indicated on the horizontal axis). The right-side bar above each peptide identifier on the horizontal axis displays cell viability of hIAPP mixed with each IAPP variant (1:1 ratio of each IAPP with 12.8 μM of hIAPP).

FIG. 7 is a table listing amino acid sequences of variants of seal IAPP tested for inhibitory potential against hIAPP amyloid formation. Peptides inhibiting hIAPP amyloid formation are indicated with a bold "yes" in the "Inhibit" column, while peptides rescuing cells from hIAPP toxicity are indicated with a bold "yes" in the "Rescue" column.

Figure 8:
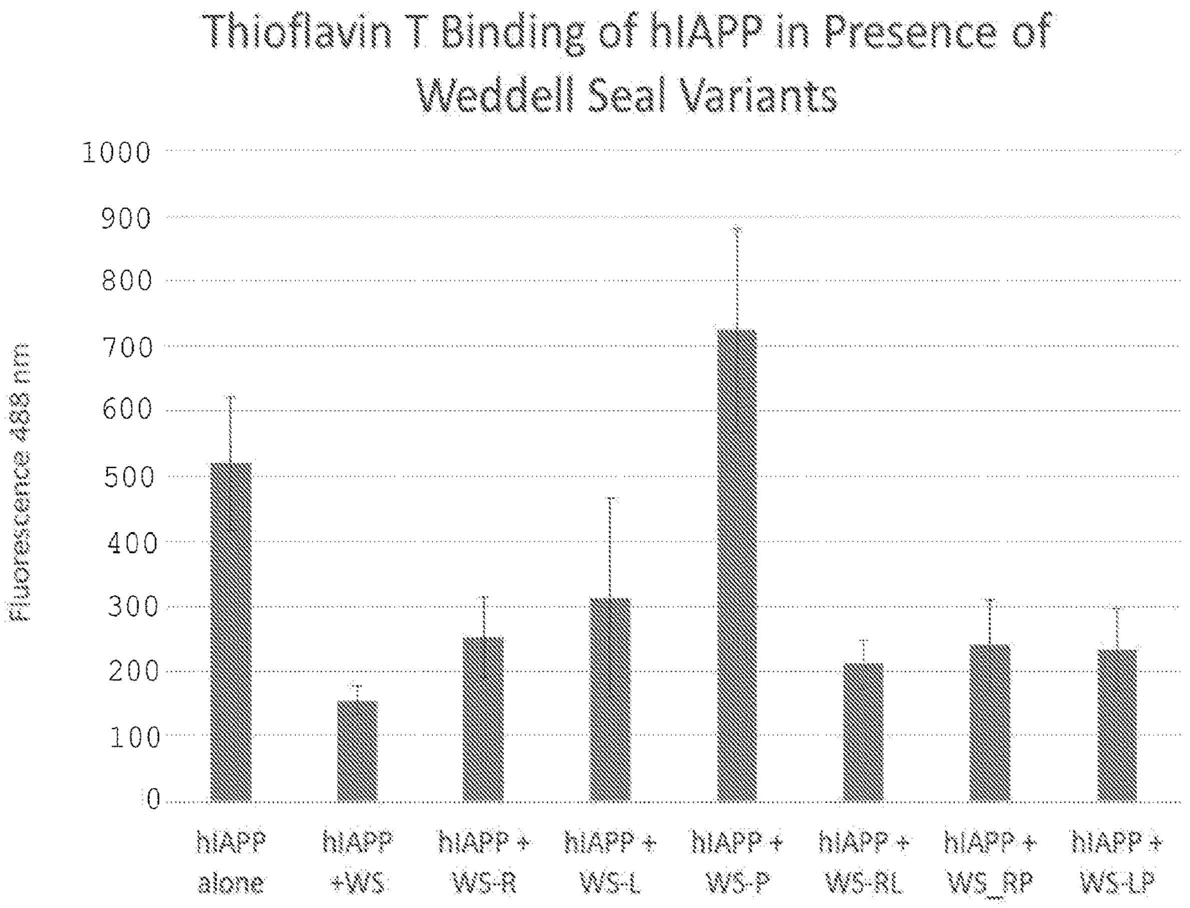

FIG. 8 is a chart showing the results of a thioflavin T binding assay of hIAPP when mixed with the indicated Weddell seal IAPP peptide variants. Data show the average of a minimum of three trials with error bars showing standard deviation among trials.

Figure 9:
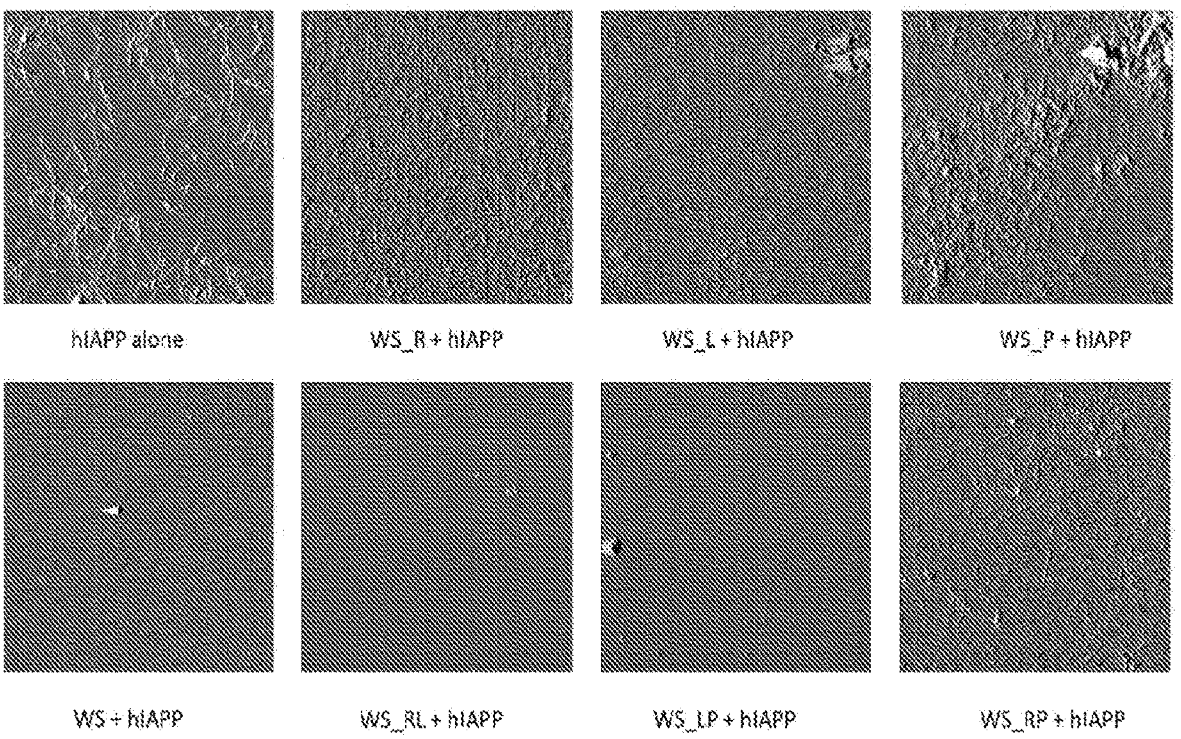

FIG. 9 shows AFM images of hIAPP mixed with the indicated Weddell seal IAPP variants. All scans show raw data with no flattening and are 10 m×10 m.

Figure 10:
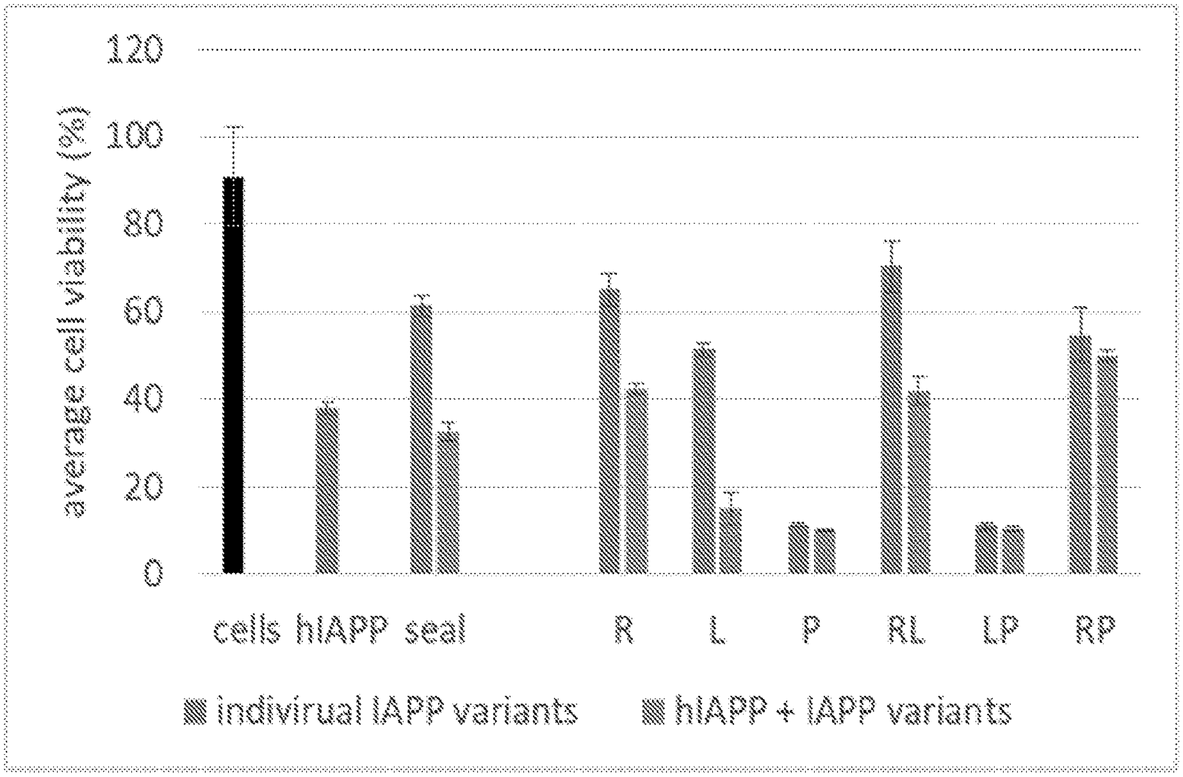

FIG. 10 is a chart showing the results of an MTT viability assay. The black bar at the far left shows the average viability of cells alone. The left-side bar above each peptide identifier (WS, WS-R, etc.) on the horizontal axis indicates the average cell viability upon addition of 12.8 μM hIAPP or Weddell seal IAPP variant peptide individually. The right-side bar above each peptide identifier on the horizontal axis displays cell viability of hIAPP mixed with Weddell seal IAPP variant (12.8 μM of a mixture of hIAPP with Weddell seal IAPP at a 1:1 ratio) FIG. 11 is a table listing several peptides based on truncations of the sequence of full-length raccoon IAPP. Peptides inhibiting hIAPP amyloid formation are indicated with a bold "yes" in the "Inhibit" column, while peptides rescuing cells from hIAPP toxicity are indicated with a bold "yes" in the "Rescue" column.

Figure 12:
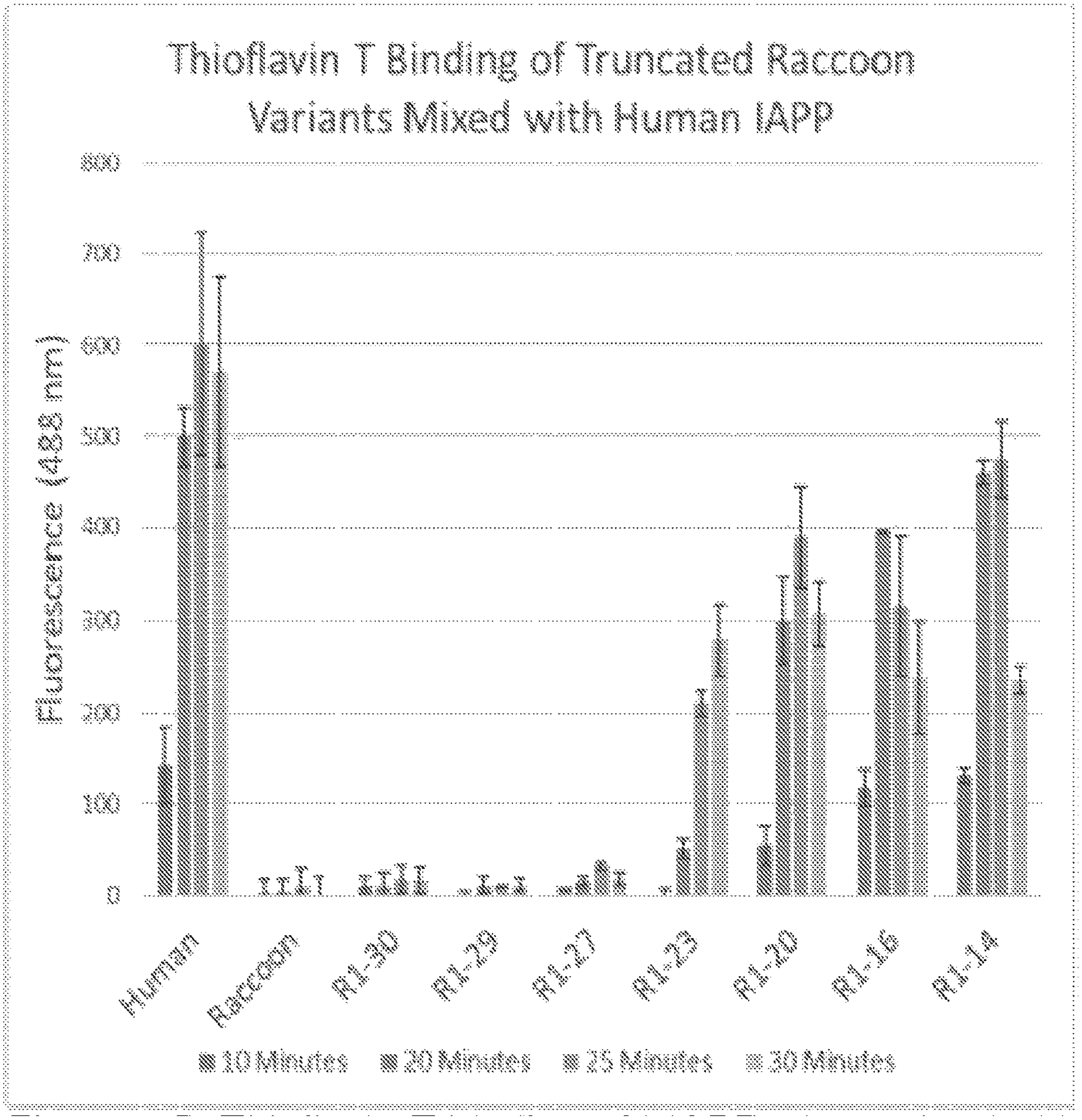

FIG. 12 is a chart showing the results of a thioflavin T binding assay of hIAPP when mixed with the indicated raccoon IAPP variants. Human IAPP was incubated with shaking at 37° C. with each indicated peptide. The four vertical bars four each peptide indicate fluorescence after 10 minutes, 20 minutes, 25 minutes, and 30 minutes respectively, from left to right. The data show the average of a minimum of two trials with error bars showing standard deviation among trials.

Figure 13:
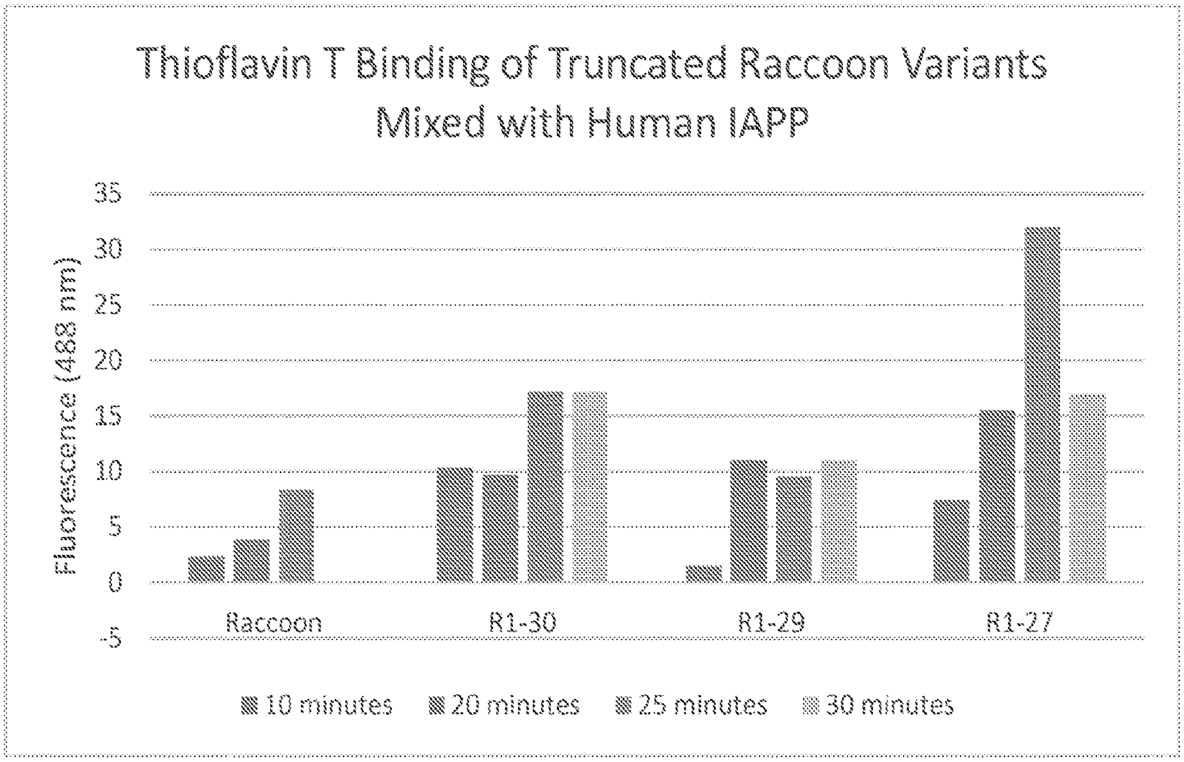

FIG. 13 is a chart depicting the results shown in FIG. 12 for the raccoon IAPP truncation mutants. The four vertical bars four each peptide indicate fluorescence after 10 minutes, 20 minutes, 25 minutes, and 30 minutes respectively, from left to right (the 30 minute reading is not included for native racoon IAPP on the left side of the chart).

FIG. 14 is a table listing several peptides based on mutations of the sequence of raccoon IAPP. Peptides inhibiting hIAPP amyloid formation are indicated with a bold "yes" in the "Inhibit" column, while peptides rescuing cells from hIAPP toxicity are indicated with a bold "yes" in the "Rescue" column.

Figure 15:
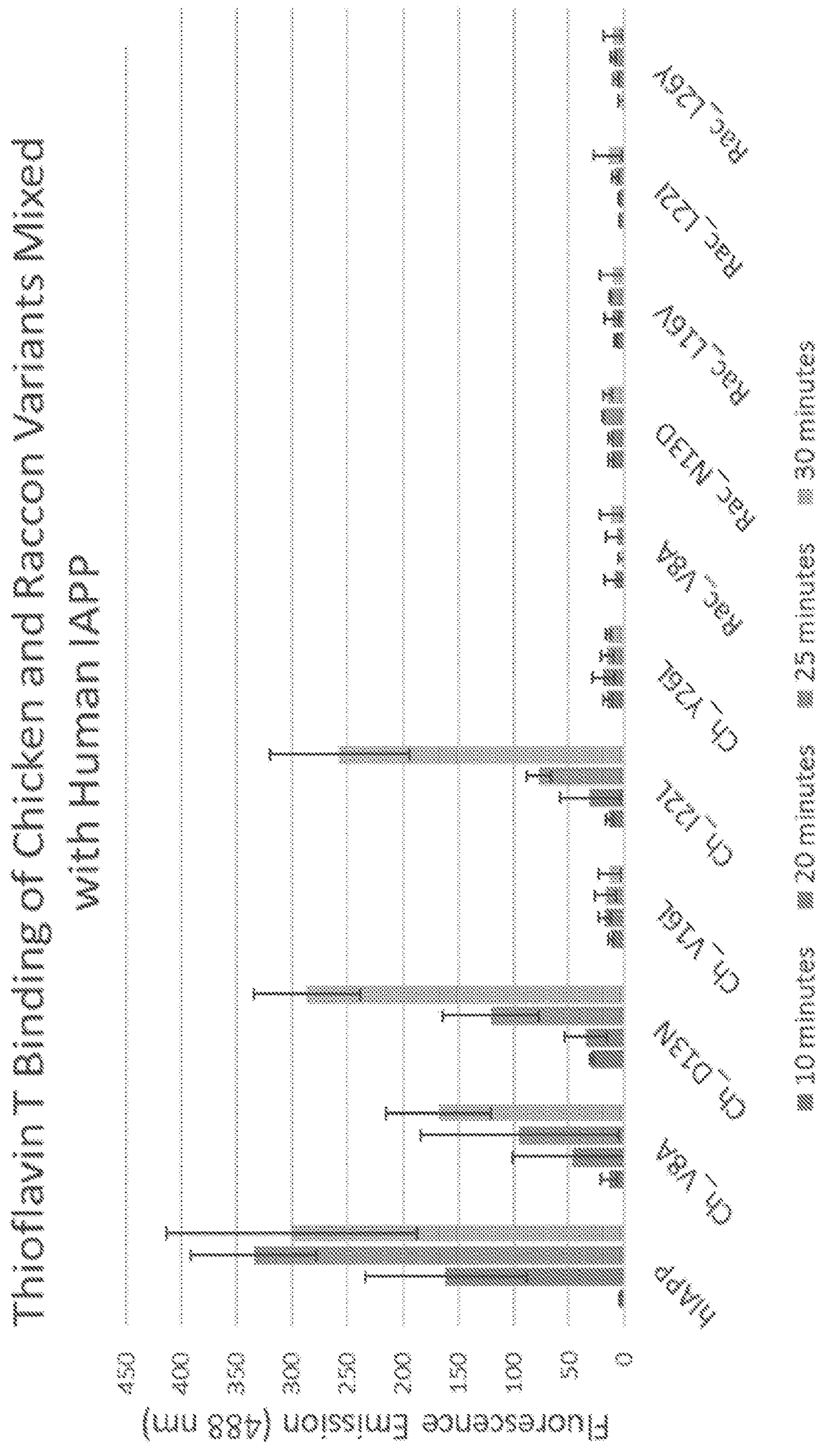

FIG. 15 is a chart showing the results of a thioflavin T binding assay of hIAPP when mixed with the indicated chicken and raccoon IAPP variants. Human IAPP was incubated with shaking at 37° C. with each indicated peptide. The four vertical bars for each peptide indicate fluorescence after 10 minutes, 20 minutes, 25 minutes, and 30 minutes respectively, from left to right. Data show the average of a minimum of two trials with error bars showing standard deviation among trials.

Figure 16:
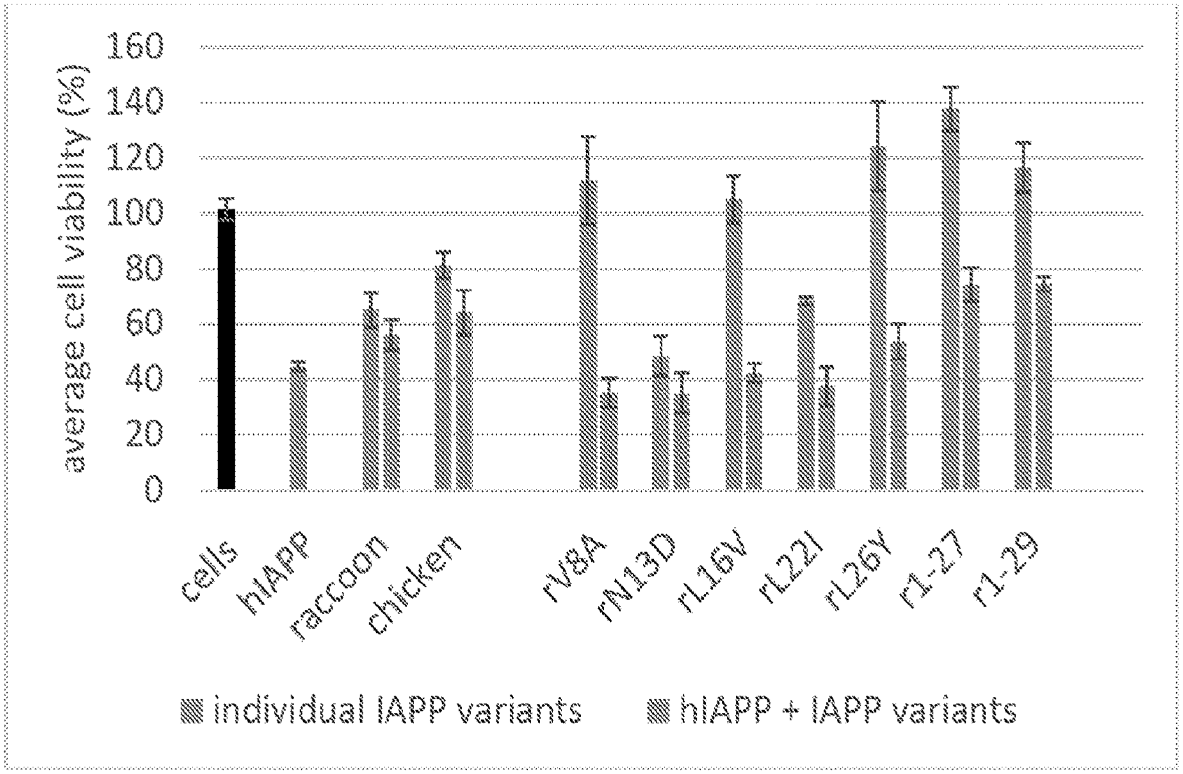

FIG. 16 is a chart showing the results of an MTT viability assay comparing variant raccoon IAPP peptides. The black bar at the far left shows the average viability of cells alone. The left-side bar above each peptide identifier on the horizontal axis indicates the average cell viability upon addition of 12.8 μM each indicated IAPP peptide individually. The right-side bar above each peptide identifier on the horizontal axis displays cell viability of hIAPP mixed with the indicated IAPP peptide (12.8 μM of a mixture of hIAPP with each indicated IAPP peptide at a 1:1 ratio).

FIG. 17 is a table listing several peptides based on truncations of the sequence of chicken IAPP. Peptides inhibiting hIAPP amyloid formation are indicated with a bold "yes" in the "Inhibit" column, while peptides rescuing cells from hIAPP toxicity are indicated with a bold "yes" in the "Rescue" column.

Figure 18:
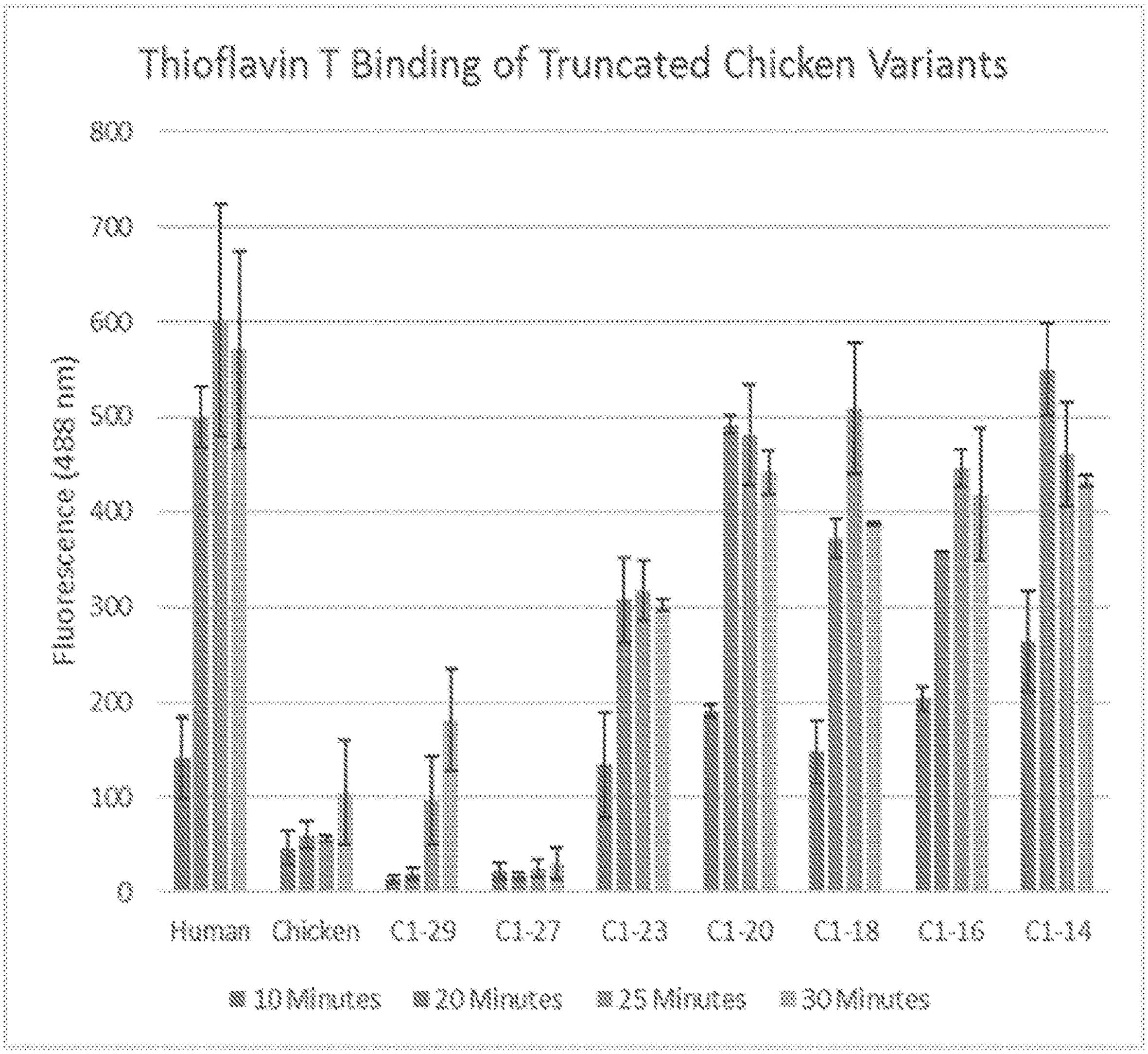

FIG. 18 is a chart showing the results of a thioflavin T binding assay of hIAPP when mixed with the indicated chicken IAPP variants. hIAPP was incubated with shaking at 37° C. with each indicated peptide. The four vertical bars four each peptide indicate fluorescence after 10 minutes, 20 minutes, 25 minutes, and 30 minutes respectively, from left to right. Data show the average of a minimum of two trials with error bars showing standard deviation among trials.

Figure 19:
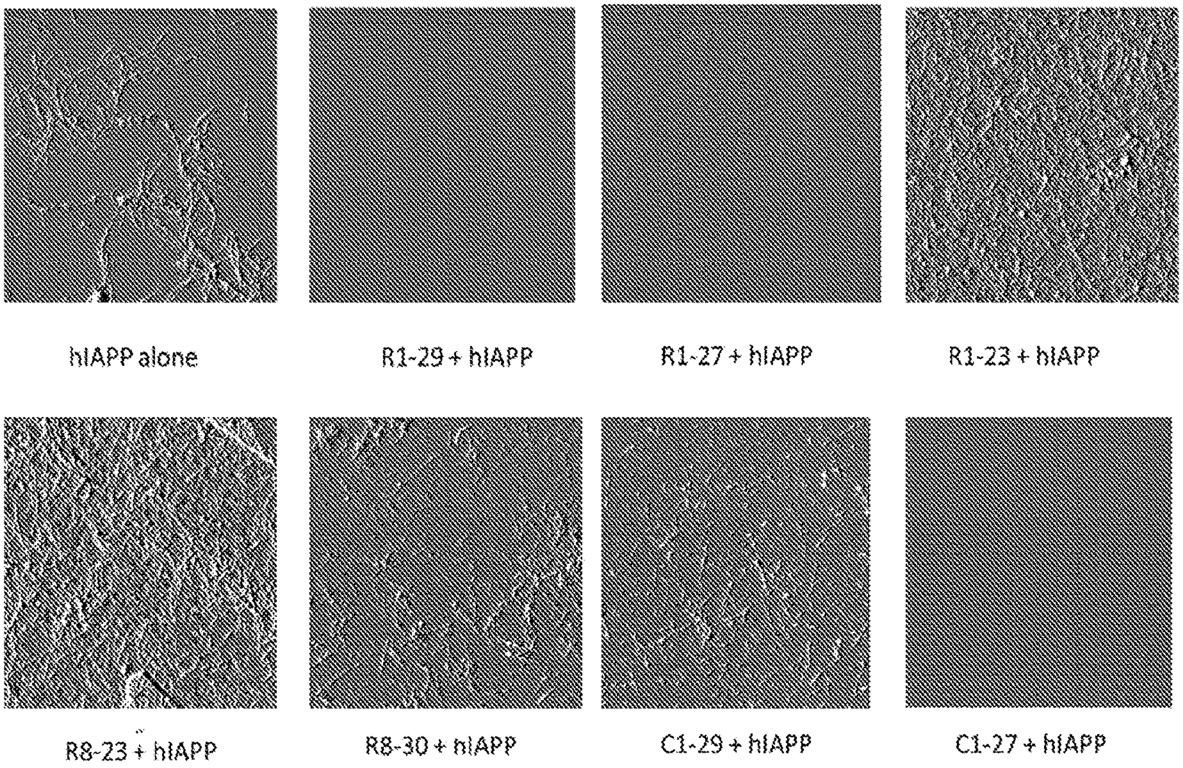

FIG. 19 shows the results of AFM scanning of truncated chicken and raccoon IAPP peptides. In the depicted scans, the R1-23, R8-23, and R8-30 peptides did not inhibit hIAPP aggregation, while the R1-29, R1-27, C1-29, and C1-27 peptides did. Each sample contained 37 μM hIAPP and 75 μM of the indicated peptide. Samples were incubated at 37° C. with shaking for 40 minutes. All scans show raw data with no flattening and are 10 m×10 m.

FIG. 20 is a table listing several peptides based on mutations of the sequence of chicken IAPP. Peptides inhibiting hIAPP amyloid formation are indicated with a bold "yes" in the "Inhibit" column, while peptides rescuing cells from hIAPP toxicity are indicated with a bold "yes" in the "Rescue" column.

Figure 21:
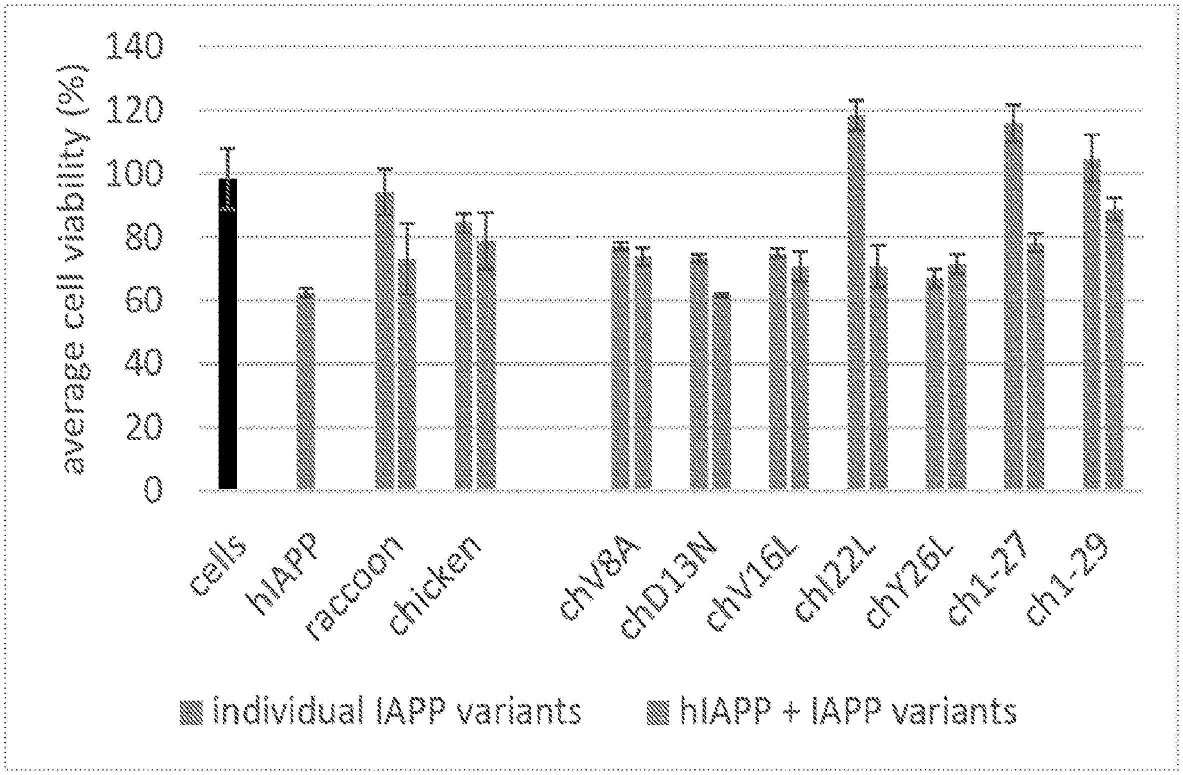

FIG. 21 is a chart showing the results of an MTT viability assay comparing variant chicken IAPP peptides. The black bar at the far left shows the average viability of cells alone. The left-side bar above each peptide identifier on the horizontal axis indicates the average cell viability upon addition of 12.8 μM hIAPP or chicken IAPP variants individually. The right-side bar above each peptide identifier on the horizontal axis displays cell viability of hIAPP mixed with chicken IAPP variants (12.8 μM of a mixture of hIAPP with each indicated IAPP peptide at a 1:1 ratio).

Figure 22:
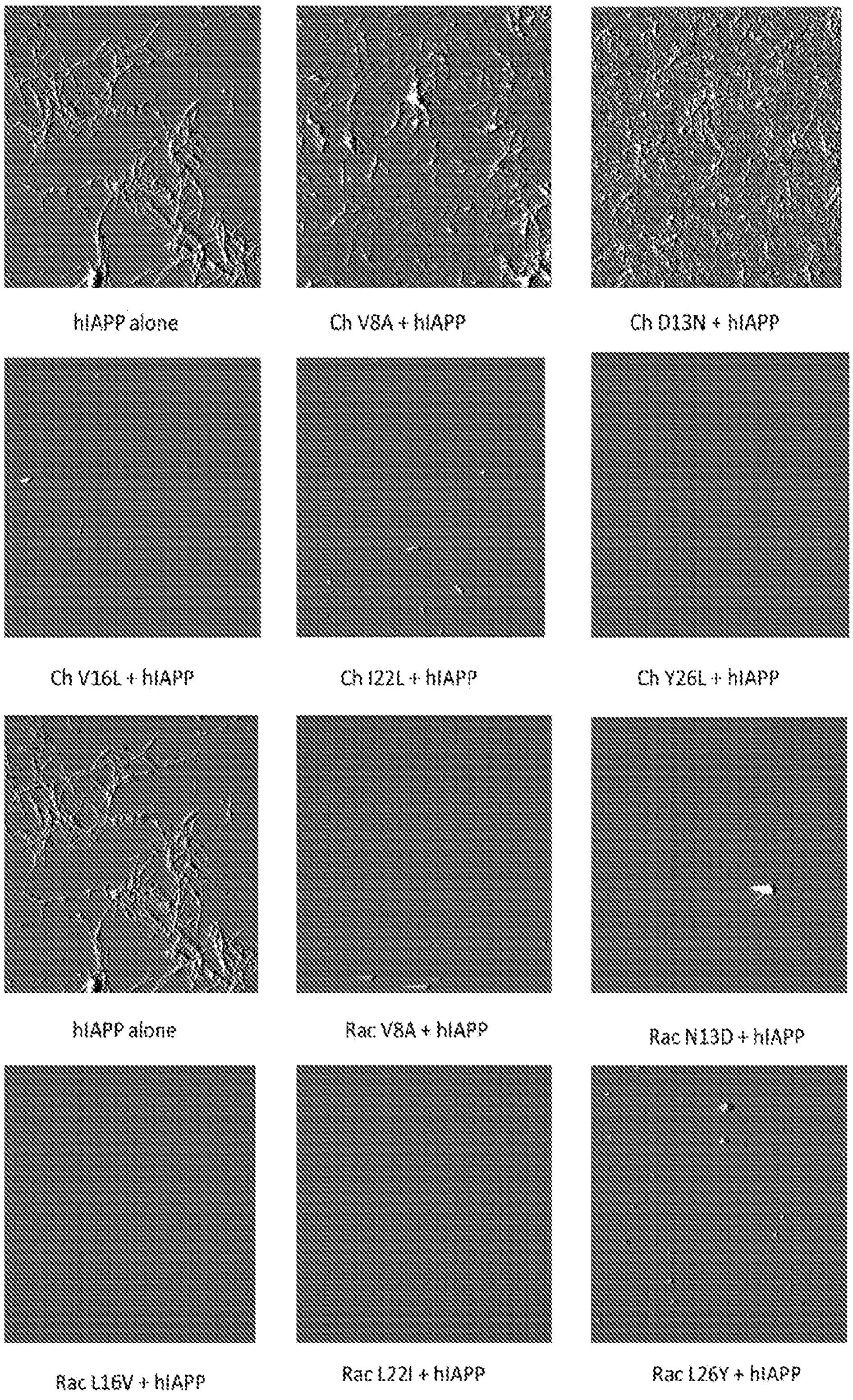

FIG. 22 shows the results of AFM scanning of raccoon and chicken IAPP variants when mixed with hIAPP. Each sample contained 37 μM hIAPP mixed with 37 μM of the indicated peptide. Samples were incubated at 37° C. with shaking for 30 minutes before depositing each sample onto freshly cleaved mica.

DESCRIPTION

Definitions

As used herein, the following terms and variations thereof have the meanings given below, unless a different meaning is intended by the context in which such term is used.

"About" and "approximately" refer to a quantity within 10% of the referenced quantity, unless the circumstances of such usage would indicate a different meaning. For example and not by way of limitation, "about 10" means between 9 and 11, and "about 10%" means between 9% and 11%.

"Amyloid disease" refers to a medical condition which is caused by or associated with aggregates of peptides and/or proteins, in particular amylin, having a fibrillar morphology and a β-sheet secondary structure. Human IAPP can form oligomers or plaques, and such aggregates are associated in some cases with type II diabetes and Alzheimer's disease.

"Cell protection" refers to the ability to attenuate, mitigate, or prevent cell damage or death, in particular the toxic effects of exposure to hIAPP. Cell protection can be measured in ways known to the art, such as with cell viability and cytotoxicity assays.

"IAPP" refers to an Islet Amyloid Polypeptide found in a variety of animals, in particular in mammals and birds.

"IAPP peptide" refers to a peptide having one or more amino acid substitutions as compared to human IAPP (SEQ ID NO:1). IAPP peptides can be truncated as compared to hIAPP and preferably have a length which is at least 70%, 73%, 75%, 80%, 85%, 90% or more of hIAPP. Preferably, IAPP peptides have at least 80% sequence identity with hIAPP, for example 89%, 92%, 95%, or up to 97% sequence identity.

"Inhibit," with respect to amyloid oligomers, fibers, and aggregates, means to slow and/or prevent the formation of such oligomers, fibers, and aggregates, as compared to the formation of such materials in the absence of a material causing such inhibition. Amyloid formation can be measured in ways known to the art, such as with thioflavin T binding assays. Preferably, an IAPP peptide inhibits IAPP aggregate formation by about 50% or more.

"Medical condition" refers to conditions which cause disease, discomfort and/or disability in a subject.

"Pharmaceutical effect" and "therapeutic effect" refer to an effect in restoring, correcting or modifying a physiological function of a subject, including the cure, mitigation, treatment or prevention of a medical condition in the subject. A "pharmaceutical composition" and a "medicament" are compositions having a pharmaceutical effect.

"Treatment" refers to an action which attenuates, improves, prevents, and/or resolves a medical condition. Treatment can refer to either prophylaxis or treatment following the development of a medical condition in need of treatment.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

IAPP Peptides

IAPP Peptides of Other Species

We compared the aggregation potential of naturally occurring IAPP peptides from a variety of organisms, and in connection with this evaluated the interaction of such peptides with human IAPP (hIAPP). During these studies, we surprisingly found that several of these animal IAPP peptides showed a remarkable ability to inhibit hIAPP aggregation, preventing the formation of amyloid and protecting mammalian cells from hIAPP toxicity.

The amino acid sequences of the naturally occurring IAPP peptides we evaluated are shown in FIG. 1, with sequence differences from human IAPP shown in bold. The animal IAPP peptides identified as showing potential for inhibiting hIAPP aggregation are listed at the top of the figure, while those variants lacking inhibitory potential are listed at the bottom. Although IAPP peptides of cow, degu, guinea pig, horse, pig, rat, and sheep origin failed to inhibit the aggregation of human IAPP, we surprisingly found that IAPP of cat, dog, chicken, polar bear, raccoon, and seal origin were able to inhibit such aggregation when mixed with hIAPP. The sequences of these inhibitory IAPP peptides are shown in Table 1 below.

TABLE 1

| Species | Sequence | SEQ ID NO. |
|---|---|---|
| cat | KCNTATCATQRLANFLIRSSNNLGAILSPTNVGSNTY | 2 |
| dog | KCNTATCATQRLANFLVRTSNNLGAILSPTNVGSNTY | 3 |
| chicken | KCNTATCVTQRLADFLVRSSSNIGAIYSPTNVGSNTY | 4 |
| polar bear | KCNTATCATQRLANFLVRSGNLFGAILSPTNVGSNTY | 5 |
| raccoon | KCNTATCVTQRLANFLLRSSNNLGAILSPTNVGSNTY | 6 |
| seal | KCNTATCATQRLANFLVRSSNNLGAILSPTNVGSNTY | 7 |

Figure 2:
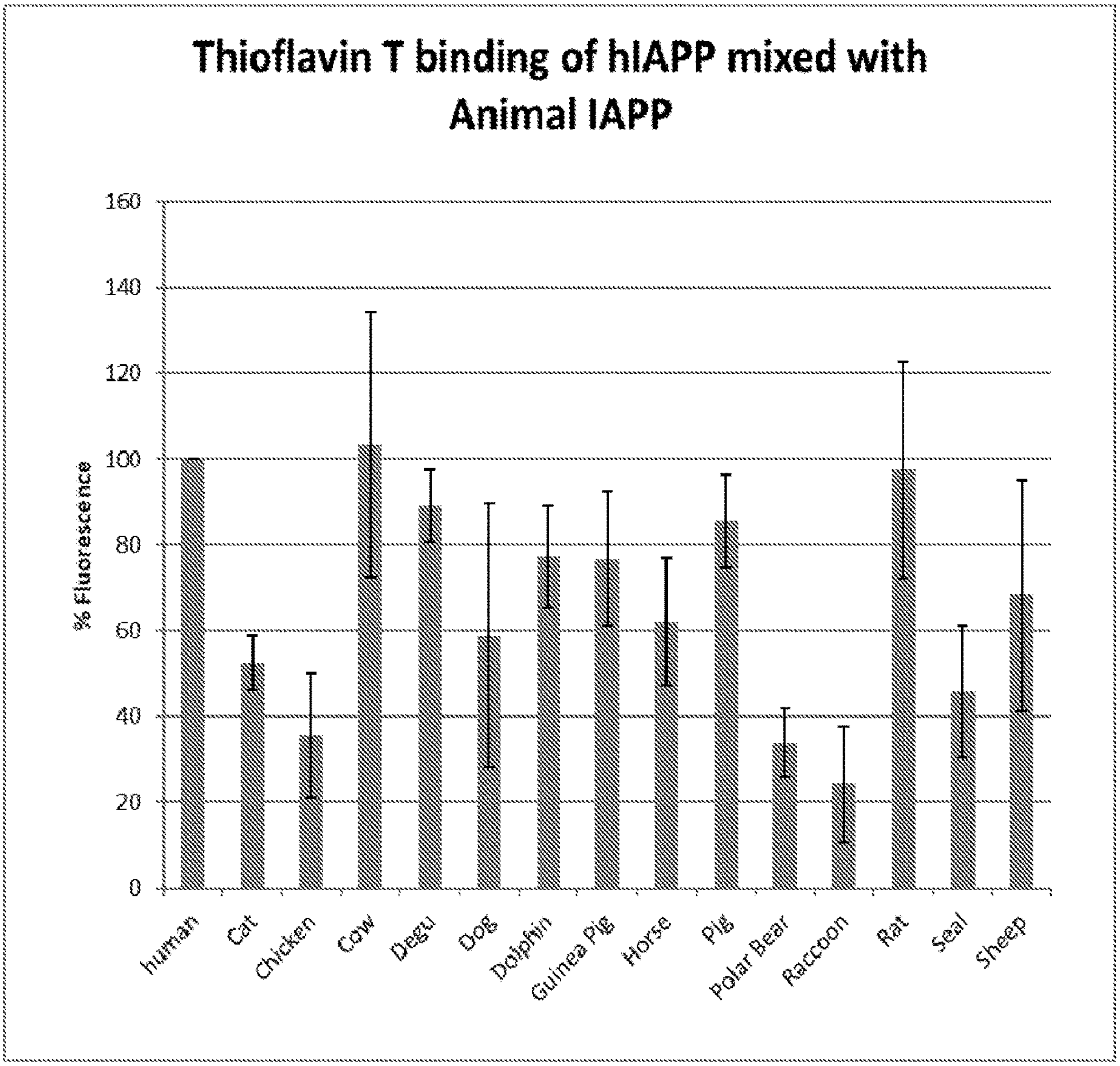
FIG. 2 is a chart showing the results of a thioflavin T binding assay in which human IAPP was mixed with IAPP from other species. The average of at least three trials is shown with error bars indicating the standard deviation among trials.

As discussed below in Examples 1-3, these peptides inhibited aggregate formation by hIAPP (FIGS. 1-3), and the raccoon and chicken IAPP peptides also rescued living cells from the toxic effects of hIAPP (FIG. 4).

Weddell Seal Variants

Variants (mutations) of Weddell seal IAPP were prepared in order to determine their ability to inhibit aggregation of hIAPP. As shown in the table in FIG. 7, some of these were found to be able to inhibit hIAPP aggregation and/or protect cells from hIAPP toxicity. These sequences are shown in Table 2 below.

TABLE 2

| Name | Sequence | SEQ ID NO. |
|---|---|---|
| WS_R | KCNTATCATQRLANFLVRSSNNFGAILSSTNVGSNTY | 15 |
| WS_RL | KCNTATCATQRLANFLVRSSNNLGAILSSTNVGSNTY | 16 |
| WS_RP | KCNTATCATQRLANFLVRSSNNFGAILSPTNVGSNTY | 17 |
| WS_LP | KCNTATCATQRLANFLVHSSNNLGAILSPTNVGSNTY | 18 |

The results of a thioflavin T binding assay of hIAPP when mixed with the indicated Weddell Seal variants are shown in FIG. 8. The WS-RL (SEQ ID NO:16) and WS-LP (SEQ ID NO:18) IAPP peptides inhibited hIAPP aggregation. The WS-RL and WS-RP (SEQ ID NO:17) also rescued cells from hIAPP toxicity in MTT assays (FIG. 10). However, the WS-LP (and WS-P) peptides proved to be toxic to cells, with and without addition of hIAPP.

Raccoon Variants

In view of the ability of raccoon IAPP to inhibit aggregate formation by hIAPP and also rescue living cells from the toxic effects of hIAPP, a series of IAPP peptides based on the natural racoon IAPP peptide sequence were synthesized and characterized for their ability to inhibit human IAPP amyloid formation and rescue cells from hIAPP toxicity. As shown in FIGS. 12, 16, and 19, several IAPP peptides truncated from the C-terminal end of the raccoon IAPP peptide were found to both inhibit hIAPP aggregation and also protect cells from hIAPP toxicity. While removal of amino acids from the N-terminal end (SEQ ID NOS:21 and 23) and middle (SEQ ID NOS:22, 24, and 25) of full-length raccoon IAPP resulted in peptides that failed to inhibit aggregation of hIAPP or reduce its cytotoxicity, removal of up to 13 amino acids at the C-terminal end of full-length raccoon IAPP resulted in peptides able to both inhibit hIAPP aggregation and also protect cells. Table 3 below lists the truncated raccoon hIAPP peptides with the ability to inhibit hIAPP aggregate formation and protect cells from hIAPP cytotoxicity.

TABLE 3

| Name | Sequence | SEQ ID NO. |
|---|---|---|
| R1-35 | KCNTATCVTQRLANFLLRSSNNLGAILSPTNVGSN | 26 |
| R1-34 | KCNTATCVTQRLANFLLRSSNNLGAILSPTNVGS | 27 |
| R1-33 | KCNTATCVTQRLANFLLRSSNNLGAILSPTNVG | 28 |
| R1-32 | KCNTATCVTQRLANFLLRSSNNLGAILSPTNV | 29 |
| R1-31 | KCNTATCVTQRLANFLLRSSNNLGAILSPTN | 30 |
| R1-30 | KCNTATCVTQRLANFLLRSSNNLGAILSPT | 31 |
| R1-29 | KCNTATCVTQRLANFLLRSSNNLGAILSP | 32 |
| R1-28 | KCNTATCVTQRLANFLLRSSNNLGAILS | 33 |
| R1-27 | KCNTATCVTQRLANFLLRSSNNLGAIL | 34 |
| R1-26 | KCNTATCVTQRLANFLLRSSNNLGAI | 35 |
| R1-25 | KCNTATCVTQRLANFLLRSSNNLGA | 36 |
| R1-24 | KCNTATCVTQRLANFLLRSSNNLG | 37 |

While the corresponding natural raccoon IAPP peptide showed some cellular toxicity when incubated with pancreatic cells, these truncated peptides showed virtually no toxicity.

Additional peptides were created with sequences modified (mutated) from raccoon IAPP, and their ability to inhibit hIAPP aggregation was analyzed. The sequences shown below in Table 4 and in FIG. 12 showed strong inhibition of hIAPP amyloid formation.

TABLE 4

| Name | Sequence | SEQ ID NO. |
|---|---|---|
| Rac_V8A | KCNTATCATQRLANFLLRSSNNLGAILSPTNVGSNTY | 42 |
| Rac_N13D | KCNTATCVTQRLADFLLRSSNNLGAILSPTNVGSNTY | 43 |
| Rac_L16V | KCNTATCVTQRLANFLVRSSNNLGAILSPTNVGSNTY | 44 |
| Rac_L22I | KCNTATCVTQRLANFLLRSSNNIGAILSPTNVGSNTY | 45 |
| Rac_L26Y | KCNTATCVTQRLANFLLRSSNNLGAIYSPTNVGSNTY | 46 |

Rac-L26Y (SEQ ID NO:46) stood out for its ability to inhibit hIAPP fiber formation and rescue cells from hIAPP toxicity, while showing minimal inherent toxicity.

Chicken Variants

In view of the ability of chicken IAPP to inhibit aggregate formation by hIAPP and also rescue living cells from the toxic effects of hIAPP, a series of IAPP peptides based on the natural chicken IAPP peptide sequence were synthesized and characterized for their ability to inhibit human IAPP amyloid formation and rescue cells from hIAPP toxicity. As shown in FIGS. 18, 19, and 21, several IAPP peptides truncated from the C-terminal end of the chicken IAPP peptides were found to inhibit hIAPP aggregation and/or protect cells from hIAPP toxicity. Removal of amino acids from the N-terminal end of full-length chicken IAPP resulted in peptides that failed to inhibit aggregation of hIAPP or reduce its cytotoxicity, and peptides truncated to under 24 amino acids in length lost amyloid inhibiting ability. However, removal of up to 13 amino acids at the C-terminal end of full-length chicken IAPP results in peptides that can inhibit hIAPP aggregation and/or protect cells from hIAPP cytotoxicity. These peptides are shown in Table 5 below.

TABLE 5

| Name | Sequence | SEQ ID NO. |
|---|---|---|
| C1-35 | KCNTATCVTQRLADFLVRSSSNIGAIYSPTNVGSN | 53 |
| C1-34 | KCNTATCVTQRLADFLVRSSSNIGAIYSPTNVGS | 54 |
| C1-33 | KCNTATCVTQRLADFLVRSSSNIGAIYSPTNVG | 55 |
| C1-32 | KCNTATCVTQRLADFLVRSSSNIGAIYSPTNV | 56 |
| C1-31 | KCNTATCVTQRLADFLVRSSSNIGAIYSPTN | 57 |
| C1-30 | KCNTATCVTQRLADFLVRSSSNIGAIYSPT | 58 |
| C1-29 | KCNTATCVTQRLADFLVRSSSNIGAIYSP | 59 |
| C1-28 | KCNTATCVTQRLADFLVRSSSNIGAIYS | 60 |
| C1-27 | KCNTATCVTQRLADFLVRSSSNIGAIY | 61 |

TABLE 5-continued

| Name | Sequence | SEQ ID NO. |
|---|---|---|
| C1-26 | KCNTATCVTQRLADFLVRSSSNIGAI | 62 |
| C1-25 | KCNTATCVTQRLADFLVRSSSNIGA | 63 |
| C1-24 | KCNTATCVTQRLADFLVRSSSNIG | 64 |

While the corresponding natural chicken IAPP peptide showed some cellular toxicity when incubated with pancreatic cells, these truncated peptides showed virtually no toxicity.

Additional peptides were created with sequences modified from chicken IAPP, and their ability to inhibit hIAPP aggregation was analyzed. The sequences below in table 6 showed strong inhibition of hIAPP amyloid formation

TABLE 6

| Name | Sequence | SEQ ID NO. |
|---|---|---|
| Ch_V8A | KCNTATCATQRLADFLVRSSSNIGAIYSPTNVGSNTY | 65 |
| Ch_V16L | KCNTATCVTQRLADFLLRSSSNIGAIYSPTNVGSNTY | 66 |
| Ch_I22L | KCNTATCVTQRLADFLVRSSSNLGAIYSPTNVGSNTY | 67 |
| Ch_Y26L | KCNTATCVTQRLADFLVRSSSNIGAILSPTNVGSNTY | 68 |

Ch-122L (SEQ ID NO:67) was able to inhibit hIAPP fiber formation and rescue cells from hIAPP toxicity while showing minimal inherent toxicity (see FIGS. 15, 21, and 22).

Measuring IAPP Peptide Effects

Any of a number of assays known to the art can be used to evaluate the ability of IAPP peptides to inhibit hIAPP aggregation and/or protect cells from hIAPP toxicity. Thioflavin T (ThT) binding is one such technique for identifying amyloid formation in real time. Human IAPP is known to bind thioflavin T during aggregation and amyloid formation, and upon binding to amyloid fibrils ThT will give a strong fluorescence signal at approximately 482 nm when excited at 450 nm. ThT fluorescence correlates linearly with amyloid concentration in a sample and therefore can be used to determine the amount of aggregation in a sample. This technique can therefore be used for identifying substances with amyloid-inhibiting potential when such substances are mixed with human IAPP under conditions known to result in the formation of aggregates by hIAPP. Determining the extent of aggregation can also be determined using other techniques, such as Atomic Force Microscopy (AFM), which can provide information about particle dimensions, shape, and substructure with nanometer resolution. In the foregoing assays and others that can be used by one of skill in the art, significant inhibition can be determined using a t-test by measuring the difference between hIAPP and hIAPP combined with an IAPP peptide. Significant results show a t-test value of <0.05.

Cytoprotection can likewise be measured by a number of assays known to the art. One such assay is the MTT assay, which is a colorimetric assay for assessing cell metabolic activity. NAD(P)H-dependent cellular oxidoreductase enzymes in the cytosolic compartment of a cell reduces the tetrazolium dye MTT 3-(4,5-dimethylthiazol-2-yl)-2,5-diphenyltetrazolium bromide to an insoluble form, formazan, which has a purple color. The reduction of MTT (and other tetrazolium dyes) depends on the cellular metabolic activity, so a loss of color in the course of performing an MTT assay indicates low metabolic activity, and is thus an indicator of cell damage and death.

Pharmaceutical Formulations

IAPP peptides can be formulated as a pharmaceutical composition (medicament) for administration in ways known to the art, including intramuscular, intravenous, and subdermal administration. Depending on the route of administration, the pharmaceutical composition can be formulated as a liquid, as a powder or other solid, or as a gel. When the composition is in powder form, the IAPP peptide can be in the form of a salt, such as an acetate salt, for example. The pharmaceutical composition can include one or more pharmaceutically acceptable carriers and/or other pharmaceutically acceptable excipients, for example to stabilize and/or deliver the composition to a subject. Excipients for the present pharmaceutical composition can include appropriate additives such as pharmaceutically effective carriers (i.e., sterile water, water, saline, and the like), buffers, neutralizing agents, stabilizers, humectants, viscosity builders, chemical stabilizers, thickeners, diluents, and/or solvents. Examples of excipients for some embodiments include, but are not limited to, alcohols and polyglycols, glycerin, waxes, water, deionized water, fatty acid esters, and the like, mixtures thereof and combinations thereof. Formulations suitable for parenteral administration, such as, for example, by intravenous, intramuscular, intradermal, and subcutaneous routes, include aqueous and non-aqueous isotonic sterile injection solutions.

Use of IAPP Peptides

IAPP peptides can be used to inhibit IAPP aggregation or protect cells, as described for example in the Examples below. In one embodiment, IAPP peptides are administered to cells in vitro in order to protect them from exposure to amyloid fibers such as aggregates of hIAPP, which have been found to induce cytotoxicity both when exogenously applied and when secreted from a cell. The present IAPP peptides can also be administered to a subject in order to reduce IAPP aggregation in vivo. The present IAPP peptides can be used in particular to treat human or other mammalian subjects with an amyloid disease such as diabetes. In one embodiment of the present invention, the present IAPP peptides which both inhibit hIAPP aggregation and protect cells from hIAPP toxicity can be administered to subjects in order to treat amyloid disease.

Peptides derived from human IAPP which inhibit amyloid fibril formation and decrease cytotoxicity such as ANFLVH, for example, have been shown to improve fasting blood glucose levels and glucose tolerance in subjects following injection (Wijesekara et al., Diabetes, Obesity and Metabolism 17: 1003-1006, 2015). The IAPP peptide pramlintide has also been used to treat diabetes in humans. This peptide contains 3 amino acid substitutions found in rat IAPP. Pramlintide, however, is more amyloidogenic than the present IAPP peptides, and also does not have a cytoprotective effect. As can be seen in the AFM scans shown in FIG. 5, raccoon IAPP alone did not aggregate, while pramlintide formed amyloid fibers under the same conditions. Raccoon IAPP peptide also prevented hIAPP from aggregating, while pramlintide was not able to do this under the same conditions. Unlike raccoon and chicken IAPP, pramlintide is also toxic to the cells and has no ability to protect cells from the toxic effects of hIAPP (see FIG. 6).

IAPP peptides can be administered to subjects in ways known to the art, such as by parenteral administration, for example via intramuscular, intravenous, or subdermal administration. In one embodiment, an IAPP peptide composition can be administered directly to a site where aggregated IAPP is found, such as to the pancreas, specifically the pancreatic islets of Langerhans. Amylin oligomers and plaques have also been identified in blood vessels, perivascular spaces, and brain tissue (parenchyma), so injection or application of an IAPP peptide composition to these organs or compartments can also be performed in order to administer the present IAPP peptides to a subject.

Depending upon the particular needs of the individual subject involved, the present peptides can be administered in various doses to provide effective treatments for amyloid diseases. Doses of from about 1 microgram (mcg) to about 500 micrograms can preferably be administered to a subject, such as doses of about 2 mcg, 5 mcg, 7 mcg, 10 mcg, 15 mcg, 20 mcg, 30 mcg, 40 mcg, 50 mcg, 60 mcg, 70 mcg, 80 mcg, 90 mcg, 100 mcg, 120 mcg, 150 mcg, 170 mcg, 200 mcg, 220 mcg, 250 mcg, 270 mcg, 300 mcg, 320 mcg, 350 mcg, 370 mcg, 400 mcg, 420 mcg, 450 mcg, or 470 mcg. The present IAPP peptides can be administered for example in amounts of 0.1 mcg/kg/day, 0.15 mcg/kg/day, 0.2 mcg/kg/day, 0.25 mcg/kg/day, 0.3 mcg/kg/day, 0.4 mcg/kg/day, 0.5 mcg/kg/day, 0.7 mcg/kg/day, 0.9 mcg/kg/day, 1.0 mcg/kg/day, 1.2 mcg/kg/day, 1.5 mcg/kg/day, 1.7 mcg/kg/day, 2.0 mcg/kg/day, 2.2 mcg/kg/day, 2.5 mcg/kg/day, 3.0 mcg/kg/day, 3.5 mcg/kg/day, 4.0 mcg/kg/day, 4.5 mcg/kg/day, or 5.0 mcg/kg/day, for example. Factors such as the aggregation-inhibiting activity of the selected peptide, half-life of the peptide, the physiological characteristics of the subject, the extent or nature of the subject's condition, and the method of administration will determine what constitutes an effective amount of the selected peptides, as is known to one of skill in the art. Generally, initial doses will be modified to determine the optimum dosage for treatment of the particular subject. Repeated doses of the present peptides administered over an extended period of time may be required.

An effective amount of any embodiment of the present invention is determined using methods known to pharmacologists and clinicians having ordinary skill in the art. For example, the animal models can be used to determine applicable dosages for a patient. A number of models for diabetes and other amyloid diseases are known. A transgenic mouse model of Type 2 diabetes which has been used to evaluate IAPP-derived peptides is disclosed for example by Wijesekara et al. (Diabetes, Obesity and Metabolism 17: 1003-1006, 2015).

As known to those of skill in the art, a very low dose of a peptide, i.e. one found to be minimally toxic in animals (e.g., 1/10×LD10 in mice), can first be administered to a patient, and if that dose is found to be safe, the patient can be treated at a higher dose. A therapeutically effective amount of one of the present peptides for treating amyloid disease can then be determined by administering increasing amounts of such peptide to a patient suffering from such condition until such time as the patient's symptoms are observed or are reported by the patient to be diminished or eliminated.

Blood levels of the present peptides can be determined using routine biological and chemical assays and these blood levels can be matched to the route of administration and half-life of a selected peptide. The blood level and route of administration can then be used to establish a therapeutically effective amount of a pharmaceutical composition comprising one of the present peptides for preventing and/or treating amyloid disease.

It should be noted that raccoon and chicken IAPP were found to prevent hIAPP aggregation in the presence of human insulin, and therefore would be safe for use in conjunction with treatments for diabetes. Both raccoon and chicken IAPPs are also less aggregation-prone than Pramlintide, another diabetes treatment.

EXAMPLES

Example 1: Thioflavin T Assay with hIAPP Inhibitors from Other Species

To identify IAPP peptides having inhibitory potential against hIAPP aggregation, the peptides shown in FIG. 1 from a number of species (cow, degu, guinea pig, horse, pig, rat, and sheep, cow, degu, guinea pig, horse, pig, rat, and sheep) were mixed with hIAPP at a 2:1 molar ratio of animal peptide to hIAPP and incubated under conditions known to promote hIAPP aggregation and fibril formation. IAPP alone, or hIAPP mixed with an animal IAPP, was pipetted into a glass tube and the HFIP was removed under speed-vacuum. The resulting peptide sample was dissolved in 20 mM Tris buffer pH 7.4.

37 μM human IAPP was mixed with 75 μM of each indicated animal IAPP. Aggregation was initiated by incubating samples at 37° C. with shaking at 200 rpm for 40 minutes. At indicated time points, a 17 μL aliquot of each sample was mixed with 663 μL of 50.0 μM thioflavin T in 20 mM Tris buffer (pH 7.4). Thioflavin T fluorescence emission was then recorded at 488 nm using a Hitachi F-7000 fluorescence spectrophotometer.

After 40 minutes, these samples were monitored for their ability to bind thioflavin T (see FIG. 2) and their ability to form fibrils as identified with atomic force microscopy.

Example 2: Atomic Force Microscopy with hIAPP Inhibitors from Other Species

AFM was used to test the amyloid-inhibitory potential of each animal IAPP peptide shown in FIG. 1 directly. Samples of hIAPP with or without animal IAPP were prepared as described in Example 1 and were then incubated with shaking at 37° C. for 40 minutes. After this incubation, 17 μL of each sample was deposited onto freshly cleaved mica. Samples were incubated for 5 minutes at room temperature before washing with 200 μL sterile water. After drying, the samples were scanned using an MFP-3D atomic force microscope (Asylum Research) set on A/C mode and a 240 m silicon cantilever (Olympus).

Human IAPP, under these conditions, forms high-density fibrils when deposited onto mica and scanned via AFM. Many of the animal IAPP variants are known to likewise form fibrils and yield amyloid-plaques when scanned via AFM. When mixed with hIAPP, the animal IAPP peptides from cow, degu, dolphin, guinea pig, horse, pig, rat and sheep either had no effect on hIAPP fibril formation or appeared to promote fibrils with hIAPP. Six IAPP variants were found to inhibit hIAPP fibril formation, with chicken, cat, dog, polar bear, raccoon, and seal all showing significant ability to prevent fiber formation. This is in spite of the fact that all of these IAPP peptides (except polar bear IAPP) are known to aggregate and form fibrils themselves under these or similar conditions

Example 3: Cell Viability Assay with hIAPP Inhibitors from Other Species

To test the ability of the animal IAPP variants to rescue living cells from the toxic effects of hIAPP, both viability and cytotoxicity assays were performed. To test cell viability, a MTT colorimetric assay measuring the conversion of yellow tetrazolium salt into purple formazan crystal catalyzed by a mitochondrial reductase was used. Cell viability studies were performed using RIN-m cells (ATCC, CRL-2057). An equal number of RIN-m cells were plated in triplicate and incubated overnight in 96-well plates. The next day, fresh RPMI-1640 with phenol red supplemented with 10% FBS was added to cells. Hexafluoroisopropanol (HFIP) was removed from each individual human and animal IAPP using a centrivap concentrator (LabOnco). All IAPP peptide samples were re-suspended in RPMI-1640 with 10% FBS. To ensure even re-suspension, each resulting IAPP-containing vial was scraped with a pipette tip six times and vortexed (Vortex Genie Mixer) for 15 seconds. The whole process, from drying each IAPP peptide to adding each IAPP peptide to the cells was uniform to ensure that each sample was incubated for an equal amount of time with each IAPP peptide. IAPP peptides were added to cells and incubated for 46 hours at 37° C. Post-incubation, the media in each well was replaced by fresh DMEM/F-12 without phenol red. MTT (3-(4,5-dimethyl-2-thiazolyl)-2,5-diphenyl-tetrazolium bromide) was added into each well and incubated at 37° C. for 2 hours. Formazan crystals, formed on the bottom of the wells, were re-suspended in solubilization buffer (20% SDS and 50% dimethylformamide). The absorbance in each well was taken at 570 nm using a Multiskan FC Microplate Photometer (Thermos Fisher Scientific). Media were obtained from ATCC. All incubations took place in a water jacketed incubator in 5% carbon dioxide at 37° C. (Shell Lab).

The MTT viability assay was used to measure cell viability of RIN-m cells upon addition of hIAPP alone, the addition of each animal IAPP peptide alone, and hIAPP mixed with each animal IAPP peptide (results shown in FIG. 5). RIN-m cells alone were used as a control and set to 100% cell viability. Addition of 12.8 μM human IAPP consistently resulted in a decrease in cell viability to 55+/−5%. Addition of 12.8 μM raccoon, cat, seal, polar bear, and pig IAPP variants individually resulted in an average of 20-25% decrease in cell viability, while addition of chicken and rat IAPPs had an improved effect on cell viability. Mixing of hIAPP with the raccoon IAPP variant at a 1:1 ratio (12.8 μM concentration of each IAPP) protected the RIN-m cells from the toxic effects of hIAPP. Addition of raccoon IAPP to hIAPP increased the cell viability from 55% to an average of 72% ($p=0.005705$). Addition of chicken IAPP variant to hIAPP increased cell viability to an average of 76% ($p=0.013556$). Addition of cat and seal IAPP variants to hIAPP also increased cell viability, to about 62%, with more varied results. Polar bear, rat, and pig IAPP variants were not capable of protecting RIN-m cells from the toxic effects of hIAPP.

Example 4: Weddell Seal IAPP Peptide Variants

Thioflavin T binding assays were performed with the variants of Weddell seal IAPP shown in FIG. 7. Human IAPP (37 μM) was mixed with each of the indicated Weddell seal variants (at 75 μM) and incubated for 30 minutes at 37° C. with shaking at 200 rpm. The results are shown in FIG. 8. The Weddell seal IAPP peptides were likewise subjected to atomic force microscopy as described in Example 2. These results, shown in FIG. 9, indicate that the WS_RL and WS_LP variants were strong inhibitors of hIAPP fiber formation.

Example 5: Truncated Raccoon IAPP Peptide Variants

Thioflavin T binding assays were performed with the variants of raccoon IAPP shown in FIG. 11. Human IAPP was mixed with each of the indicated raccoon variants and incubated at 37° C. with shaking. The results are shown in FIGS. 12 and 13. The R1-27, R1-29, and R1-30 variants inhibited hIAPP aggregation and also rescued cells from hIAPP-induced cytotoxicity in MTT viability assays (see FIG. 16).

Example 6: Mutated Raccoon IAPP Peptide Variants

Thioflavin T binding assays were performed with the variants of raccoon IAPP shown in FIG. 10. Human IAPP was mixed with each of the indicated raccoon variants and incubated at 37° C. with shaking. The results are shown in FIG. 15. The Rac_V8A, Rac_N13D, Rac_L16V, Rac_L22I, and Rac_L26Y variants inhibited hIAPP aggregation, and the Rac_L26Y also improved cell viability in the presence of hIAPP in a MTT viability assay, as shown in FIG. 16.

Example 7: Truncated Chicken IAPP Peptide Variants

Thioflavin T binding assays were performed with the variants of chicken IAPP shown in FIG. 17. Human IAPP was mixed with each of the indicated chicken variants and incubated at 37° C. with shaking. The results are shown in FIG. 18. The C1-27 and C1-29 variants inhibited hIAPP aggregation and also rescued cells from hIAPP-induced cytotoxicity in MTT viability assays (see FIG. 21). Although the C1-29 peptide prevented ThT binding, amyloid fibers were formed when AFM scans were performed with this peptide (as described in Example 2), so this peptide is indicated in FIG. 13 as not inhibiting aggregation of hIAPP. However, it was able to protect cells in MTT assays, so it is believed to inhibit formation of toxic oligomers while having a lesser effect on inhibiting the formation of fibers (which are less toxic and less able to bind ThT).

Example 8: Mutated Chicken IAPP Peptide Variants

Thioflavin T binding assays were performed with the variants of chicken IAPP shown in FIG. 14. Human IAPP was mixed with each of the indicated chicken variants and incubated at 37° C. with shaking. The results are shown in FIG. 15. The Ch_V16L, Ch_I22L, and Ch_Y26L inhibited hIAPP aggregation and also rescued cells from hIAPP-induced cytotoxicity in MTT viability assays (see FIG. 21).

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise. Ranges which are described as being "between" two values include the indicated values.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. For example, "about 10" includes the recitation of exactly 10. All references cited herein are incorporated by reference in their entirety.

What is claimed is:

1. An islet amyloid polypeptide (IAPP) peptide consisting of the peptide of SEQ ID NO:68.

2. A pharmaceutical composition comprising the IAPP peptide according to claim 1 and one or more pharmaceutically acceptable excipients.

3. A method of inhibiting aggregation of islet amyloid polypeptide (IAPP) in a subject in need thereof, comprising the step of administering to the subject the IAPP peptide of claim 1.

* * * * *

```
                              SEQUENCE LISTING


<160> NUMBER OF SEQ ID NOS: 69

<210> SEQ ID NO 1
<211> LENGTH: 37
<212> TYPE: PRT
<213> ORGANISM: Homo sapiens

<400> SEQUENCE: 1

Lys Cys Asn Thr Ala Thr Cys Ala Thr Gln Arg Leu Ala Asn Phe Leu
1               5                   10                  15

Val His Ser Ser Asn Asn Phe Gly Ala Ile Leu Ser Ser Thr Asn Val
            20                  25                  30

Gly Ser Asn Thr Tyr
        35


<210> SEQ ID NO 2
<211> LENGTH: 37
<212> TYPE: PRT
<213> ORGANISM: Felis catus

<400> SEQUENCE: 2

Lys Cys Asn Thr Ala Thr Cys Ala Thr Gln Arg Leu Ala Asn Phe Leu
1               5                   10                  15

Ile Arg Ser Ser Asn Asn Leu Gly Ala Ile Leu Ser Pro Thr Asn Val
            20                  25                  30

Gly Ser Asn Thr Tyr
        35


<210> SEQ ID NO 3
<211> LENGTH: 37
<212> TYPE: PRT
<213> ORGANISM: Canis lupus familiaris

<400> SEQUENCE: 3

Lys Cys Asn Thr Ala Thr Cys Ala Thr Gln Arg Leu Ala Asn Phe Leu
1               5                   10                  15

Val Arg Thr Ser Asn Asn Leu Gly Ala Ile Leu Ser Pro Thr Asn Val
            20                  25                  30

Gly Ser Asn Thr Tyr
        35


<210> SEQ ID NO 4
<211> LENGTH: 37
<212> TYPE: PRT
<213> ORGANISM: Gallus gallus

<400> SEQUENCE: 4

Lys Cys Asn Thr Ala Thr Cys Val Thr Gln Arg Leu Ala Asp Phe Leu
1               5                   10                  15

Val Arg Ser Ser Ser Asn Ile Gly Ala Ile Tyr Ser Pro Thr Asn Val
            20                  25                  30

Gly Ser Asn Thr Tyr
        35
```

<210> SEQ ID NO 5
<211> LENGTH: 37
<212> TYPE: PRT
<213> ORGANISM: Ursus maritimus

<400> SEQUENCE: 5

```
Lys Cys Asn Thr Ala Thr Cys Ala Thr Gln Arg Leu Ala Asn Phe Leu
1               5                   10                  15

Val Arg Ser Gly Asn Leu Phe Gly Ala Ile Leu Ser Pro Thr Asn Val
            20                  25                  30

Gly Ser Asn Thr Tyr
        35
```

<210> SEQ ID NO 6
<211> LENGTH: 37
<212> TYPE: PRT
<213> ORGANISM: Procyon lotor

<400> SEQUENCE: 6

```
Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr Asn Val
            20                  25                  30

Gly Ser Asn Thr Tyr
        35
```

<210> SEQ ID NO 7
<211> LENGTH: 37
<212> TYPE: PRT
<213> ORGANISM: Leptonychotes weddellii

<400> SEQUENCE: 7

```
Lys Cys Asn Thr Ala Thr Cys Ala Thr Gln Arg Leu Ala Asn Phe Leu
1               5                   10                  15

Val Arg Ser Ser Asn Asn Leu Gly Ala Ile Leu Ser Pro Thr Asn Val
            20                  25                  30

Gly Ser Asn Thr Tyr
        35
```

<210> SEQ ID NO 8
<211> LENGTH: 37
<212> TYPE: PRT
<213> ORGANISM: Bos taurus

<400> SEQUENCE: 8

```
Lys Cys Gly Thr Ala Thr Cys Glu Thr Gln Arg Leu Ala Asn Phe Leu
1               5                   10                  15

Ala Pro Ser Ser Asn Lys Leu Gly Ala Ile Phe Ser Pro Thr Lys Met
            20                  25                  30

Gly Ser Asn Thr Tyr
        35
```

<210> SEQ ID NO 9
<211> LENGTH: 37
<212> TYPE: PRT
<213> ORGANISM: Octodon degus

<400> SEQUENCE: 9

```
Lys Cys Asn Thr Ala Thr Cys Ala Thr Gln Arg Leu Thr Asn Phe Leu
1               5                   10                  15

Val Arg Ser Ser His Asn Leu Gly Ala Ala Leu Pro Pro Thr Lys Val
```

20 25 30

Gly Ser Asn Thr Tyr
35

<210> SEQ ID NO 10
<211> LENGTH: 37
<212> TYPE: PRT
<213> ORGANISM: Cavia porcellus

<400> SEQUENCE: 10

Lys Cys Asn Thr Ala Thr Cys Ala Thr Gln Arg Leu Thr Asn Phe Leu
1 5 10 15

Val Arg Ser Ser His Asn Leu Gly Ala Ala Leu Leu Pro Thr Asp Val
20 25 30

Gly Ser Asn Thr Tyr
35

<210> SEQ ID NO 11
<211> LENGTH: 37
<212> TYPE: PRT
<213> ORGANISM: Equus ferus

<400> SEQUENCE: 11

Lys Cys Asp Thr Ala Thr Cys Val Thr Gln Arg Leu Ala Asn Phe Leu
1 5 10 15

Val His Ser Ser Asn Asn Leu Gly Ala Ile Leu Ser Pro Thr Ser Val
20 25 30

Gly Ser Asn Thr Tyr
35

<210> SEQ ID NO 12
<211> LENGTH: 37
<212> TYPE: PRT
<213> ORGANISM: Sus scrofa domesticus

<400> SEQUENCE: 12

Lys Cys Asn Met Ala Thr Cys Ala Thr Gln His Leu Ala Asn Phe Leu
1 5 10 15

Asp Arg Ser Arg Asn Asn Phe Gly Ala Ile Phe Ser Pro Thr Lys Val
20 25 30

Gly Ser Asn Thr Tyr
35

<210> SEQ ID NO 13
<211> LENGTH: 37
<212> TYPE: PRT
<213> ORGANISM: Rattus rattus

<400> SEQUENCE: 13

Lys Cys Asn Thr Ala Thr Cys Ala Thr Gln Arg Leu Ala Asn Phe Leu
1 5 10 15

Val Arg Ser Ser Asn Asn Leu Gly Pro Val Leu Pro Pro Thr Asn Val
20 25 30

Gly Ser Asn Thr Tyr
35

<210> SEQ ID NO 14
<211> LENGTH: 37
<212> TYPE: PRT
<213> ORGANISM: Ovis aries

<400> SEQUENCE: 14

Lys Cys Gly Thr Ala Thr Cys Ala Thr Gln Arg Leu Ala Asn Phe Leu
1 5 10 15

Ala Pro Ser Gly Asn Lys Leu Gly Ala Val Phe Ser Pro Arg Lys Met
20 25 30

Gly Ser Asn Thr His
35

<210> SEQ ID NO 15
<211> LENGTH: 37
<212> TYPE: PRT
<213> ORGANISM: Artificial sequence
<220> FEATURE:
<223> OTHER INFORMATION: Leptonychotes weddellii mutation

<400> SEQUENCE: 15

Lys Cys Asn Thr Ala Thr Cys Ala Thr Gln Arg Leu Ala Asn Phe Leu
1 5 10 15

Val Arg Ser Ser Asn Asn Phe Gly Ala Ile Leu Ser Ser Thr Asn Val
20 25 30

Gly Ser Asn Thr Tyr
35

<210> SEQ ID NO 16
<211> LENGTH: 37
<212> TYPE: PRT
<213> ORGANISM: Artificial sequence
<220> FEATURE:
<223> OTHER INFORMATION: Leptonychotes weddellii mutation

<400> SEQUENCE: 16

Lys Cys Asn Thr Ala Thr Cys Ala Thr Gln Arg Leu Ala Asn Phe Leu
1 5 10 15

Val Arg Ser Ser Asn Asn Leu Gly Ala Ile Leu Ser Ser Thr Asn Val
20 25 30

Gly Ser Asn Thr Tyr
35

<210> SEQ ID NO 17
<211> LENGTH: 35
<212> TYPE: PRT
<213> ORGANISM: Artificial sequence
<220> FEATURE:
<223> OTHER INFORMATION: Leptonychotes weddellii mutation

<400> SEQUENCE: 17

Lys Thr Ala Thr Cys Ala Thr Gln Arg Leu Ala Asn Phe Leu Val His
1 5 10 15

Ser Ser Asn Asn Leu Gly Ala Ile Leu Ser Pro Thr Asn Val Gly Ser
20 25 30

Asn Thr Tyr
35

<210> SEQ ID NO 18
<211> LENGTH: 35
<212> TYPE: PRT
<213> ORGANISM: Artificial sequence
<220> FEATURE:
<223> OTHER INFORMATION: Leptonychotes weddellii mutation

<400> SEQUENCE: 18

Lys Thr Ala Thr Cys Ala Thr Gln Arg Leu Ala Asn Phe Leu Val His

```
1               5                   10                  15

Ser Ser Asn Asn Leu Gly Ala Ile Leu Ser Pro Thr Asn Val Gly Ser
            20                  25                  30

Asn Thr Tyr
        35


<210> SEQ ID NO 19
<211> LENGTH: 37
<212> TYPE: PRT
<213> ORGANISM: Artificial sequence
<220> FEATURE:
<223> OTHER INFORMATION: Leptonychotes weddellii mutation

<400> SEQUENCE: 19

Lys Cys Asn Thr Ala Thr Cys Ala Thr Gln Arg Leu Ala Asn Phe Leu
1               5                   10                  15

Val His Ser Ser Asn Asn Leu Gly Ala Ile Leu Ser Ser Thr Asn Val
            20                  25                  30

Gly Ser Asn Thr Tyr
        35


<210> SEQ ID NO 20
<211> LENGTH: 37
<212> TYPE: PRT
<213> ORGANISM: Artificial sequence
<220> FEATURE:
<223> OTHER INFORMATION: Leptonychotes weddellii mutation

<400> SEQUENCE: 20

Lys Cys Asn Thr Ala Thr Cys Ala Thr Gln Arg Leu Ala Asn Phe Leu
1               5                   10                  15

Val His Ser Ser Asn Asn Phe Gly Ala Ile Leu Ser Pro Thr Asn Val
            20                  25                  30

Gly Ser Asn Thr Tyr
        35


<210> SEQ ID NO 21
<211> LENGTH: 23
<212> TYPE: PRT
<213> ORGANISM: Artificial sequence
<220> FEATURE:
<223> OTHER INFORMATION: Procyon lotor truncation

<400> SEQUENCE: 21

Phe Leu Leu Arg Ser Ser Asn Asn Leu Gly Ala Ile Leu Ser Pro Thr
1               5                   10                  15

Asn Val Gly Ser Asn Thr Tyr
            20


<210> SEQ ID NO 22
<211> LENGTH: 17
<212> TYPE: PRT
<213> ORGANISM: Artificial sequence
<220> FEATURE:
<223> OTHER INFORMATION: Procyon lotor truncation

<400> SEQUENCE: 22

Phe Leu Leu Arg Ser Ser Asn Asn Leu Gly Ala Ile Leu Ser Pro Thr
1               5                   10                  15

Asn


<210> SEQ ID NO 23
```

```
<211> LENGTH: 30
<212> TYPE: PRT
<213> ORGANISM: Artificial sequence
<220> FEATURE:
<223> OTHER INFORMATION: Procyon lotor truncation

<400> SEQUENCE: 23

Ala Thr Gln Arg Leu Ala Asn Phe Leu Leu Arg Ser Ser Asn Asn Leu
1               5                   10                  15

Gly Ala Ile Leu Ser Pro Thr Asn Val Gly Ser Asn Thr Tyr
            20                  25                  30


<210> SEQ ID NO 24
<211> LENGTH: 23
<212> TYPE: PRT
<213> ORGANISM: Artificial sequence
<220> FEATURE:
<223> OTHER INFORMATION: Procyon lotor truncation

<400> SEQUENCE: 24

Val Thr Gln Arg Leu Ala Asn Phe Leu Leu Arg Ser Ser Asn Asn Leu
1               5                   10                  15

Gly Ala Ile Leu Ser Pro Thr
            20


<210> SEQ ID NO 25
<211> LENGTH: 16
<212> TYPE: PRT
<213> ORGANISM: Artificial sequence
<220> FEATURE:
<223> OTHER INFORMATION: Procyon lotor truncation

<400> SEQUENCE: 25

Val Thr Gln Arg Leu Ala Asn Phe Leu Leu Arg Ser Ser Asn Asn Leu
1               5                   10                  15


<210> SEQ ID NO 26
<211> LENGTH: 35
<212> TYPE: PRT
<213> ORGANISM: Artificial sequence
<220> FEATURE:
<223> OTHER INFORMATION: Procyon lotor truncation

<400> SEQUENCE: 26

Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr Asn Val
            20                  25                  30

Gly Ser Asn
        35


<210> SEQ ID NO 27
<211> LENGTH: 34
<212> TYPE: PRT
<213> ORGANISM: Artificial sequence
<220> FEATURE:
<223> OTHER INFORMATION: Procyon lotor truncation

<400> SEQUENCE: 27

Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr Asn Val
            20                  25                  30

Gly Ser
```

<210> SEQ ID NO 28
<211> LENGTH: 33
<212> TYPE: PRT
<213> ORGANISM: Artificial sequence
<220> FEATURE:
<223> OTHER INFORMATION: Procyon lotor truncation

<400> SEQUENCE: 28

```
Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr Asn Val
            20                  25                  30

Gly
```

<210> SEQ ID NO 29
<211> LENGTH: 32
<212> TYPE: PRT
<213> ORGANISM: Artificial sequence
<220> FEATURE:
<223> OTHER INFORMATION: Procyon lotor truncation

<400> SEQUENCE: 29

```
Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr Asn Val
            20                  25                  30
```

<210> SEQ ID NO 30
<211> LENGTH: 31
<212> TYPE: PRT
<213> ORGANISM: Artificial sequence
<220> FEATURE:
<223> OTHER INFORMATION: Procyon lotor truncation

<400> SEQUENCE: 30

```
Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr Asn
            20                  25                  30
```

<210> SEQ ID NO 31
<211> LENGTH: 30
<212> TYPE: PRT
<213> ORGANISM: Artificial sequence
<220> FEATURE:
<223> OTHER INFORMATION: Procyon lotor truncation

<400> SEQUENCE: 31

```
Lys Cys Asn Thr Ala Thr Cys Val Thr Gln Arg Leu Ala Asn Phe Leu
1               5                   10                  15

Leu Arg Ser Ser Asn Asn Leu Gly Ala Ile Leu Ser Pro Thr
            20                  25                  30
```

<210> SEQ ID NO 32
<211> LENGTH: 29
<212> TYPE: PRT
<213> ORGANISM: Artificial sequence
<220> FEATURE:
<223> OTHER INFORMATION: Procyon lotor truncation

<400> SEQUENCE: 32

```
Lys Cys Asn Thr Ala Thr Cys Val Thr Gln Arg Leu Ala Asn Phe Leu
1               5                   10                  15
```

Leu Arg Ser Ser Asn Asn Leu Gly Ala Ile Leu Ser Pro
20 25

<210> SEQ ID NO 33
<211> LENGTH: 28
<212> TYPE: PRT
<213> ORGANISM: Artificial sequence
<220> FEATURE:
<223> OTHER INFORMATION: Procyon lotor truncation

<400> SEQUENCE: 33

Lys Cys Asn Thr Ala Thr Cys Val Thr Gln Arg Leu Ala Asn Phe Leu
1 5 10 15

Leu Arg Ser Ser Asn Asn Leu Gly Ala Ile Leu Ser
20 25

<210> SEQ ID NO 34
<211> LENGTH: 27
<212> TYPE: PRT
<213> ORGANISM: Artificial sequence
<220> FEATURE:
<223> OTHER INFORMATION: Procyon lotor truncation

<400> SEQUENCE: 34

Lys Cys Asn Thr Ala Thr Cys Val Thr Gln Arg Leu Ala Asn Phe Leu
1 5 10 15

Leu Arg Ser Ser Asn Asn Leu Gly Ala Ile Leu
20 25

<210> SEQ ID NO 35
<211> LENGTH: 26
<212> TYPE: PRT
<213> ORGANISM: Artificial sequence
<220> FEATURE:
<223> OTHER INFORMATION: Procyon lotor truncation

<400> SEQUENCE: 35

Lys Cys Asn Thr Ala Thr Cys Val Thr Gln Arg Leu Ala Asn Phe Leu
1 5 10 15

Leu Arg Ser Ser Asn Asn Leu Gly Ala Ile
20 25

<210> SEQ ID NO 36
<211> LENGTH: 25
<212> TYPE: PRT
<213> ORGANISM: Artificial sequence
<220> FEATURE:
<223> OTHER INFORMATION: Procyon lotor truncation

<400> SEQUENCE: 36

Lys Cys Asn Thr Ala Thr Cys Val Thr Gln Arg Leu Ala Asn Phe Leu
1 5 10 15

Leu Arg Ser Ser Asn Asn Leu Gly Ala
20 25

<210> SEQ ID NO 37
<211> LENGTH: 24
<212> TYPE: PRT
<213> ORGANISM: Artificial sequence
<220> FEATURE:
<223> OTHER INFORMATION: Procyon lotor truncation

<400> SEQUENCE: 37

Lys Cys Asn Thr Ala Thr Cys Val Thr Gln Arg Leu Ala Asn Phe Leu 1 5 10 15

Leu Arg Ser Ser Asn Asn Leu Gly
20

<210> SEQ ID NO 38
<211> LENGTH: 23
<212> TYPE: PRT
<213> ORGANISM: Artificial sequence
<220> FEATURE:
<223> OTHER INFORMATION: Procyon lotor truncation

<400> SEQUENCE: 38

Lys Cys Asn Thr Ala Thr Cys Val Thr Gln Arg Leu Ala Asn Phe Leu
1 5 10 15

Leu Arg Ser Ser Asn Asn Leu
20

<210> SEQ ID NO 39
<211> LENGTH: 20
<212> TYPE: PRT
<213> ORGANISM: Artificial sequence
<220> FEATURE:
<223> OTHER INFORMATION: Procyon lotor truncation

<400> SEQUENCE: 39

Lys Cys Asn Thr Ala Thr Cys Val Thr Gln Arg Leu Ala Asn Phe Leu
1 5 10 15

Leu Arg Ser Ser
20

<210> SEQ ID NO 40
<211> LENGTH: 16
<212> TYPE: PRT
<213> ORGANISM: Artificial sequence
<220> FEATURE:
<223> OTHER INFORMATION: Procyon lotor truncation

<400> SEQUENCE: 40

Lys Cys Asn Thr Ala Thr Cys Val Thr Gln Arg Leu Ala Asn Phe Leu
1 5 10 15

<210> SEQ ID NO 41
<211> LENGTH: 14
<212> TYPE: PRT
<213> ORGANISM: Artificial sequence
<220> FEATURE:
<223> OTHER INFORMATION: Procyon lotor truncation

<400> SEQUENCE: 41

Lys Cys Asn Thr Ala Thr Cys Val Thr Gln Arg Leu Ala Asn
1 5 10

<210> SEQ ID NO 42
<211> LENGTH: 37
<212> TYPE: PRT
<213> ORGANISM: Artificial sequence
<220> FEATURE:
<223> OTHER INFORMATION: Procyon lotor mutation

<400> SEQUENCE: 42

Lys Cys Asn Thr Ala Thr Cys Ala Thr Gln Arg Leu Ala Asn Phe Leu
1 5 10 15

Leu Arg Ser Ser Asn Asn Leu Gly Ala Ile Leu Ser Pro Thr Asn Val
20 25 30

Gly Ser Asn Thr Tyr
        35

<210> SEQ ID NO 43
<211> LENGTH: 37
<212> TYPE: PRT
<213> ORGANISM: Artificial sequence
<220> FEATURE:
<223> OTHER INFORMATION: Procyon lotor mutation

<400> SEQUENCE: 43

Lys Cys Asn Thr Ala Thr Cys Val Thr Gln Arg Leu Ala Asp Phe Leu
1               5                   10                  15

Leu Arg Ser Ser Asn Asn Leu Gly Ala Ile Leu Ser Pro Thr Asn Val
            20                  25                  30

Gly Ser Asn Thr Tyr
        35

<210> SEQ ID NO 44
<211> LENGTH: 37
<212> TYPE: PRT
<213> ORGANISM: Artificial sequence
<220> FEATURE:
<223> OTHER INFORMATION: Procyon lotor mutation

<400> SEQUENCE: 44

Lys Cys Asn Thr Ala Thr Cys Val Thr Gln Arg Leu Ala Asn Phe Leu
1               5                   10                  15

Val Arg Ser Ser Asn Asn Leu Gly Ala Ile Leu Ser Pro Thr Asn Val
            20                  25                  30

Gly Ser Asn Thr Tyr
        35

<210> SEQ ID NO 45
<211> LENGTH: 37
<212> TYPE: PRT
<213> ORGANISM: Artificial sequence
<220> FEATURE:
<223> OTHER INFORMATION: Procyon lotor mutation

<400> SEQUENCE: 45

Lys Cys Asn Thr Ala Thr Cys Val Thr Gln Arg Leu Ala Asn Phe Leu
1               5                   10                  15

Leu Arg Ser Ser Asn Asn Ile Gly Ala Ile Leu Ser Pro Thr Asn Val
            20                  25                  30

Gly Ser Asn Thr Tyr
        35

<210> SEQ ID NO 46
<211> LENGTH: 37
<212> TYPE: PRT
<213> ORGANISM: Artificial sequence
<220> FEATURE:
<223> OTHER INFORMATION: Procyon lotor mutation

<400> SEQUENCE: 46

Lys Cys Asn Thr Ala Thr Cys Val Thr Gln Arg Leu Ala Asn Phe Leu
1               5                   10                  15

Leu Arg Ser Ser Asn Asn Leu Gly Ala Ile Tyr Ser Pro Thr Asn Val
            20                  25                  30

Gly Ser Asn Thr Tyr
        35

<210> SEQ ID NO 47
<211> LENGTH: 30
<212> TYPE: PRT
<213> ORGANISM: Artificial sequence
<220> FEATURE:
<223> OTHER INFORMATION: Gallus gallus truncation

<400> SEQUENCE: 47

Ala Thr Gln Arg Leu Ala Asp Phe Leu Val Arg Ser Ser Ser Asn Ile
1 5 10 15

Gly Ala Ile Tyr Ser Pro Thr Asn Val Gly Ser Asn Thr Tyr
20 25 30

<210> SEQ ID NO 48
<211> LENGTH: 23
<212> TYPE: PRT
<213> ORGANISM: Artificial sequence
<220> FEATURE:
<223> OTHER INFORMATION: Gallus gallus truncation

<400> SEQUENCE: 48

Lys Cys Asn Thr Ala Thr Cys Val Thr Gln Arg Leu Ala Asp Phe Leu
1 5 10 15

Val Arg Ser Ser Ser Asn Ile
20

<210> SEQ ID NO 49
<211> LENGTH: 20
<212> TYPE: PRT
<213> ORGANISM: Artificial sequence
<220> FEATURE:
<223> OTHER INFORMATION: Gallus gallus truncation

<400> SEQUENCE: 49

Lys Cys Asn Thr Ala Thr Cys Val Thr Gln Arg Leu Ala Asp Phe Leu
1 5 10 15

Val Arg Ser Ser
20

<210> SEQ ID NO 50
<211> LENGTH: 18
<212> TYPE: PRT
<213> ORGANISM: Artificial sequence
<220> FEATURE:
<223> OTHER INFORMATION: Gallus gallus truncation

<400> SEQUENCE: 50

Lys Cys Asn Thr Ala Thr Cys Val Thr Gln Arg Leu Ala Asp Phe Leu
1 5 10 15

Val Arg

<210> SEQ ID NO 51
<211> LENGTH: 16
<212> TYPE: PRT
<213> ORGANISM: Artificial sequence
<220> FEATURE:
<223> OTHER INFORMATION: Gallus gallus truncation

<400> SEQUENCE: 51

Lys Cys Asn Thr Ala Thr Cys Val Thr Gln Arg Leu Ala Asp Phe Leu
1 5 10 15

<210> SEQ ID NO 52
<211> LENGTH: 14

<212> TYPE: PRT
<213> ORGANISM: Artificial sequence
<220> FEATURE:
<223> OTHER INFORMATION: Gallus gallus truncation

<400> SEQUENCE: 52

Lys Cys Asn Thr Ala Thr Cys Val Thr Gln Arg Leu Ala Asp
1 5 10

<210> SEQ ID NO 53
<211> LENGTH: 35
<212> TYPE: PRT
<213> ORGANISM: Artificial sequence
<220> FEATURE:
<223> OTHER INFORMATION: Gallus gallus truncation

<400> SEQUENCE: 53

Lys Cys Asn Thr Ala Thr Cys Val Thr Gln Arg Leu Ala Asp Phe Leu
1 5 10 15

Val Arg Ser Ser Ser Asn Ile Gly Ala Ile Tyr Ser Pro Thr Asn Val
20 25 30

Gly Ser Asn
35

<210> SEQ ID NO 54
<211> LENGTH: 34
<212> TYPE: PRT
<213> ORGANISM: Artificial sequence
<220> FEATURE:
<223> OTHER INFORMATION: Gallus gallus truncation

<400> SEQUENCE: 54

Lys Cys Asn Thr Ala Thr Cys Val Thr Gln Arg Leu Ala Asp Phe Leu
1 5 10 15

Val Arg Ser Ser Ser Asn Ile Gly Ala Ile Tyr Ser Pro Thr Asn Val
20 25 30

Gly Ser

<210> SEQ ID NO 55
<211> LENGTH: 33
<212> TYPE: PRT
<213> ORGANISM: Artificial sequence
<220> FEATURE:
<223> OTHER INFORMATION: Gallus gallus truncation

<400> SEQUENCE: 55

Lys Cys Asn Thr Ala Thr Cys Val Thr Gln Arg Leu Ala Asp Phe Leu
1 5 10 15

Val Arg Ser Ser Ser Asn Ile Gly Ala Ile Tyr Ser Pro Thr Asn Val
20 25 30

Gly

<210> SEQ ID NO 56
<211> LENGTH: 32
<212> TYPE: PRT
<213> ORGANISM: Artificial sequence
<220> FEATURE:
<223> OTHER INFORMATION: Gallus gallus truncation

<400> SEQUENCE: 56

Lys Cys Asn Thr Ala Thr Cys Val Thr Gln Arg Leu Ala Asp Phe Leu
1 5 10 15

Val Arg Ser Ser Ser Asn Ile Gly Ala Ile Tyr Ser Pro Thr Asn Val

```
            20                  25                  30


<210> SEQ ID NO 57
<211> LENGTH: 31
<212> TYPE: PRT
<213> ORGANISM: Artificial sequence
<220> FEATURE:
<223> OTHER INFORMATION: Gallus gallus truncation

<400> SEQUENCE: 57

Lys Cys Asn Thr Ala Thr Cys Val Thr Gln Arg Leu Ala Asp Phe Leu
1               5                   10                  15

Val Arg Ser Ser Ser Asn Ile Gly Ala Ile Tyr Ser Pro Thr Asn
            20                  25                  30


<210> SEQ ID NO 58
<211> LENGTH: 30
<212> TYPE: PRT
<213> ORGANISM: Artificial sequence
<220> FEATURE:
<223> OTHER INFORMATION: Gallus gallus truncation

<400> SEQUENCE: 58

Lys Cys Asn Thr Ala Thr Cys Val Thr Gln Arg Leu Ala Asp Phe Leu
1               5                   10                  15

Val Arg Ser Ser Ser Asn Ile Gly Ala Ile Tyr Ser Pro Thr
            20                  25                  30


<210> SEQ ID NO 59
<211> LENGTH: 29
<212> TYPE: PRT
<213> ORGANISM: Artificial sequence
<220> FEATURE:
<223> OTHER INFORMATION: Gallus gallus truncation

<400> SEQUENCE: 59

Lys Cys Asn Thr Ala Thr Cys Val Thr Gln Arg Leu Ala Asp Phe Leu
1               5                   10                  15

Val Arg Ser Ser Ser Asn Ile Gly Ala Ile Tyr Ser Pro
            20                  25


<210> SEQ ID NO 60
<211> LENGTH: 28
<212> TYPE: PRT
<213> ORGANISM: Artificial sequence
<220> FEATURE:
<223> OTHER INFORMATION: Gallus gallus truncation

<400> SEQUENCE: 60

Lys Cys Asn Thr Ala Thr Cys Val Thr Gln Arg Leu Ala Asp Phe Leu
1               5                   10                  15

Val Arg Ser Ser Ser Asn Ile Gly Ala Ile Tyr Ser
            20                  25


<210> SEQ ID NO 61
<211> LENGTH: 27
<212> TYPE: PRT
<213> ORGANISM: Artificial sequence
<220> FEATURE:
<223> OTHER INFORMATION: Gallus gallus truncation

<400> SEQUENCE: 61

Lys Cys Asn Thr Ala Thr Cys Val Thr Gln Arg Leu Ala Asp Phe Leu
1               5                   10                  15
```

Val Arg Ser Ser Ser Asn Ile Gly Ala Ile Tyr
20 25

<210> SEQ ID NO 62
<211> LENGTH: 26
<212> TYPE: PRT
<213> ORGANISM: Artificial sequence
<220> FEATURE:
<223> OTHER INFORMATION: Gallus gallus truncation

<400> SEQUENCE: 62

Lys Cys Asn Thr Ala Thr Cys Val Thr Gln Arg Leu Ala Asp Phe Leu
1 5 10 15

Val Arg Ser Ser Ser Asn Ile Gly Ala Ile
20 25

<210> SEQ ID NO 63
<211> LENGTH: 25
<212> TYPE: PRT
<213> ORGANISM: Artificial sequence
<220> FEATURE:
<223> OTHER INFORMATION: Artificial sequence

<400> SEQUENCE: 63

Lys Cys Asn Thr Ala Thr Cys Val Thr Gln Arg Leu Ala Asp Phe Leu
1 5 10 15

Val Arg Ser Ser Ser Asn Ile Gly Ala
20 25

<210> SEQ ID NO 64
<211> LENGTH: 24
<212> TYPE: PRT
<213> ORGANISM: Artificial sequence
<220> FEATURE:
<223> OTHER INFORMATION: Gallus gallus truncation

<400> SEQUENCE: 64

Lys Cys Asn Thr Ala Thr Cys Val Thr Gln Arg Leu Ala Asp Phe Leu
1 5 10 15

Val Arg Ser Ser Ser Asn Ile Gly
20

<210> SEQ ID NO 65
<211> LENGTH: 37
<212> TYPE: PRT
<213> ORGANISM: Artificial sequence
<220> FEATURE:
<223> OTHER INFORMATION: Gallus gallus mutation

<400> SEQUENCE: 65

Lys Cys Asn Thr Ala Thr Cys Ala Thr Gln Arg Leu Ala Asp Phe Leu
1 5 10 15

Val Arg Ser Ser Ser Asn Ile Gly Ala Ile Tyr Ser Pro Thr Asn Val
20 25 30

Gly Ser Asn Thr Tyr
35

<210> SEQ ID NO 66
<211> LENGTH: 37
<212> TYPE: PRT
<213> ORGANISM: Artificial sequence
<220> FEATURE:
<223> OTHER INFORMATION: Gallus gallus mutation

<400> SEQUENCE: 66

-continued

```
Lys Cys Asn Thr Ala Thr Cys Val Thr Gln Arg Leu Ala Asp Phe Leu
1               5                   10                  15

Leu Arg Ser Ser Ser Asn Ile Gly Ala Ile Tyr Ser Pro Thr Asn Val
            20                  25                  30

Gly Ser Asn Thr Tyr
        35


<210> SEQ ID NO 67
<211> LENGTH: 37
<212> TYPE: PRT
<213> ORGANISM: Artificial sequence
<220> FEATURE:
<223> OTHER INFORMATION: Gallus gallus mutation

<400> SEQUENCE: 67

Lys Cys Asn Thr Ala Thr Cys Val Thr Gln Arg Leu Ala Asp Phe Leu
1               5                   10                  15

Val Arg Ser Ser Ser Asn Leu Gly Ala Ile Tyr Ser Pro Thr Asn Val
            20                  25                  30

Gly Ser Asn Thr Tyr
        35


<210> SEQ ID NO 68
<211> LENGTH: 37
<212> TYPE: PRT
<213> ORGANISM: Artificial sequence
<220> FEATURE:
<223> OTHER INFORMATION: Gallus gallus mutation

<400> SEQUENCE: 68

Lys Cys Asn Thr Ala Thr Cys Val Thr Gln Arg Leu Ala Asp Phe Leu
1               5                   10                  15

Val Arg Ser Ser Ser Asn Ile Gly Ala Ile Leu Ser Pro Thr Asn Val
            20                  25                  30

Gly Ser Asn Thr Tyr
        35


<210> SEQ ID NO 69
<211> LENGTH: 36
<212> TYPE: PRT
<213> ORGANISM: Artificial sequence
<220> FEATURE:
<223> OTHER INFORMATION: Gallus gallus mutation

<400> SEQUENCE: 69

Cys Asn Thr Ala Thr Cys Val Thr Gln Arg Leu Ala Asn Phe Leu Val
1               5                   10                  15

Arg Ser Ser Ser Asn Ile Gly Ala Ile Tyr Ser Pro Thr Asn Val Gly
            20                  25                  30

Ser Asn Thr Tyr
        35
```